US008922851B2

(12) United States Patent
Akimatsu

(10) Patent No.: US 8,922,851 B2
(45) Date of Patent: Dec. 30, 2014

(54) IMAGE SCANNING DEVICE

(71) Applicant: Takayuki Akimatsu, Nagoya (JP)

(72) Inventor: Takayuki Akimatsu, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/165,639

(22) Filed: Jan. 28, 2014

(65) Prior Publication Data
US 2014/0211282 A1 Jul. 31, 2014

(30) Foreign Application Priority Data
Jan. 28, 2013 (JP) ................. 2013-013419

(51) Int. Cl.
*H04N 1/04* (2006.01)
*H04N 1/12* (2006.01)

(52) U.S. Cl.
CPC .................... *H04N 1/1215* (2013.01)
USPC ........... 358/498; 358/497; 358/474; 358/496; 271/264; 399/167

(58) Field of Classification Search
CPC .......... G03G 15/6511; G03G 15/6529; G03G 21/1638; G03G 15/657; G03G 15/6573; G03G 21/1695; H04N 1/00602; B65H 2511/512; B65H 2220/01; B65H 2301/3122; B65H 29/52; B65H 3/063; B65H 3/5238
USPC ............. 358/498, 482, 1.13, 1.15, 1.12, 3.24, 358/449, 497; 399/107, 167, 90, 23, 97; 271/264, 109, 10.01, 10.09, 10.11, 271/121, 145, 226, 245, 246, 251, 274
See application file for complete search history.

(56) References Cited

U.S. PATENT DOCUMENTS

| 5,038,228 | A | * | 8/1991 | Takada .................... 358/498 |
| 5,329,373 | A | * | 7/1994 | Hayashi et al. ............ 358/296 |
| 5,442,466 | A | * | 8/1995 | Kameyama et al. ........ 358/498 |
| 5,661,572 | A | * | 8/1997 | Kameyama et al. ........ 358/498 |
| 5,956,161 | A | * | 9/1999 | Takashimizu et al. ..... 358/496 |
| 6,347,213 | B1 |  | 2/2002 | Yamanaka et al. |
| 7,574,153 | B2 | * | 8/2009 | Nakayama et al. .......... 399/45 |
| 7,688,482 | B2 | * | 3/2010 | Iwago ..................... 358/496 |
| 7,859,728 | B2 | * | 12/2010 | Yun et al. ................. 358/498 |
| 8,164,806 | B2 |  | 4/2012 | Yang et al. |
| 8,373,911 | B2 |  | 2/2013 | Iwata et al. |
| 2010/0238524 | A1 |  | 9/2010 | Yang et al. |
| 2012/0050826 | A1 |  | 3/2012 | Iwata et al. |

FOREIGN PATENT DOCUMENTS

| JP | 2000-233874 A | 8/2000 |
| JP | 2001-235815 A | 8/2001 |
| JP | 2010-219917 A | 9/2010 |
| JP | 2012-049940 A | 3/2012 |

* cited by examiner

*Primary Examiner* — Negussie Worku
(74) *Attorney, Agent, or Firm* — Banner & Witcoff, Ltd.

(57) ABSTRACT

An image scanning device has a sheet conveying roller conveying a sheet when a conveyed sheet scanning function is activated, a guide member defining a sheet feed path, a first gear transmitting a driving force to the sheet conveying roller, a first supporting shaft extending in a direction parallel with a width direction of the sheet feed path and supporting the first gear, a second gear engaging with the first gear, a second supporting shaft extending in a direction perpendicular to the first supporting shaft and supporting the second gear, a holder unit holding the second supporting shaft, the holder unit arranged at one end of the sheet feed path in the width direction, a reinforce member made of metal and extending in the width direction, first and second fixing units fixing longitudinal ends of the reinforce member to the holder unit and the guide member, respectively.

15 Claims, 18 Drawing Sheets

THIRD POSITION

FIG. 9 FOURTH POSITION

IMAGE SCANNING DEVICE

CROSS-REFERENCE TO RELATED APPLICATION

This application claims priority under 35 U.S.C. §119 from Japanese Patent Applications No. 2013-013419 filed on Jan. 28, 2013. The entire subject matter of the application is incorporated herein by reference.

BACKGROUND

1. Technical Field

Aspects of the invention relates to an image scanning device.

2. Related Art

Conventional image scanning device typically employs a gear mechanism having a plurality of spur gears to transmit a driving force to a sheet conveying roller. The sheet conveying roller is a rotating member which contacts an original sheet to be scanned and rotates to convey the original sheet when a conveyed sheet scanning function is activated.

SUMMARY

In the technique as described above, supporting shafts of a pair of spur gears engaging with each other are parallel to each other. However, there is known an image scanning device in which supporting shafts of such a pair of spur gears are arranged perpendicularly to each other. When the supporting shafts are arranged in such a manner, the technique disclosed in the publication may not be applied as it is.

In consideration of the above problem, the present invention is advantageous in that an improved image scanning device employing a pair of engaging gears of which shafts are arranged in directions perpendicular to each other.

According to aspects of the invention, there is provided an image scanning device having a conveyed sheet scanning function to scan an image on an original sheet which is being fed. Such an image scanning device has a sheet conveying roller configured to rotate and contact the sheet when at least the conveyed sheet scanning function is activated, a guide member which defines a sheet feed path to guide the sheet, a first gear provided in a transmission path through which a driving force is transmitted to the sheet conveying roller, a first supporting shaft extending in a direction parallel with a width direction of the sheet feed path and is configured to support the first gear, a second gear provided in the transmission path and engaging with the first gear, a second supporting shaft extending in a direction perpendicular to the first supporting shaft and is configured to support the second gear, a holder unit holding the second supporting shaft, the holder unit being arranged at one end side, in the width direction, of the sheet feed path, a reinforce member made of metal and extending in a direction parallel with the width direction, a first fixing unit configured to fix one longitudinal end of the reinforce member to the holder unit, and a second fixing unit configured to fix the other longitudinal end of the reinforce member to the guide member.

In this specification, a "width direction" is a direction perpendicular to a sheet conveying direction and parallel to a sheet conveying plane along which a sheet is conveyed. The sheet conveying plane is a plane (phantom plane) which faces a surface of the sheet which is being conveyed along the sheet feed path.

With the above configuration, a sheet holder unit is reinforced by reinforcing members. Further, the reinforcing members are bridged between the holding section and a guiding member, and fixed thereto. Therefore, generation of distortion of the holder unit and the guiding member can be prevented.

Further, according to aspects of the invention, it is possible to suppress occurrence of defect in engagement between a first gear and a second gear. Therefore, according to this aspect of the invention, it is possible to suppress occurrence of a loud noise at an engaging portion of the first and second gears, and a driving force can be transmitted efficiently.

BRIEF DESCRIPTION OF THE ACCOMPANYING DRAWINGS

DETAILED DESCRIPTION OF THE EMBODIMENT

Figure 1:
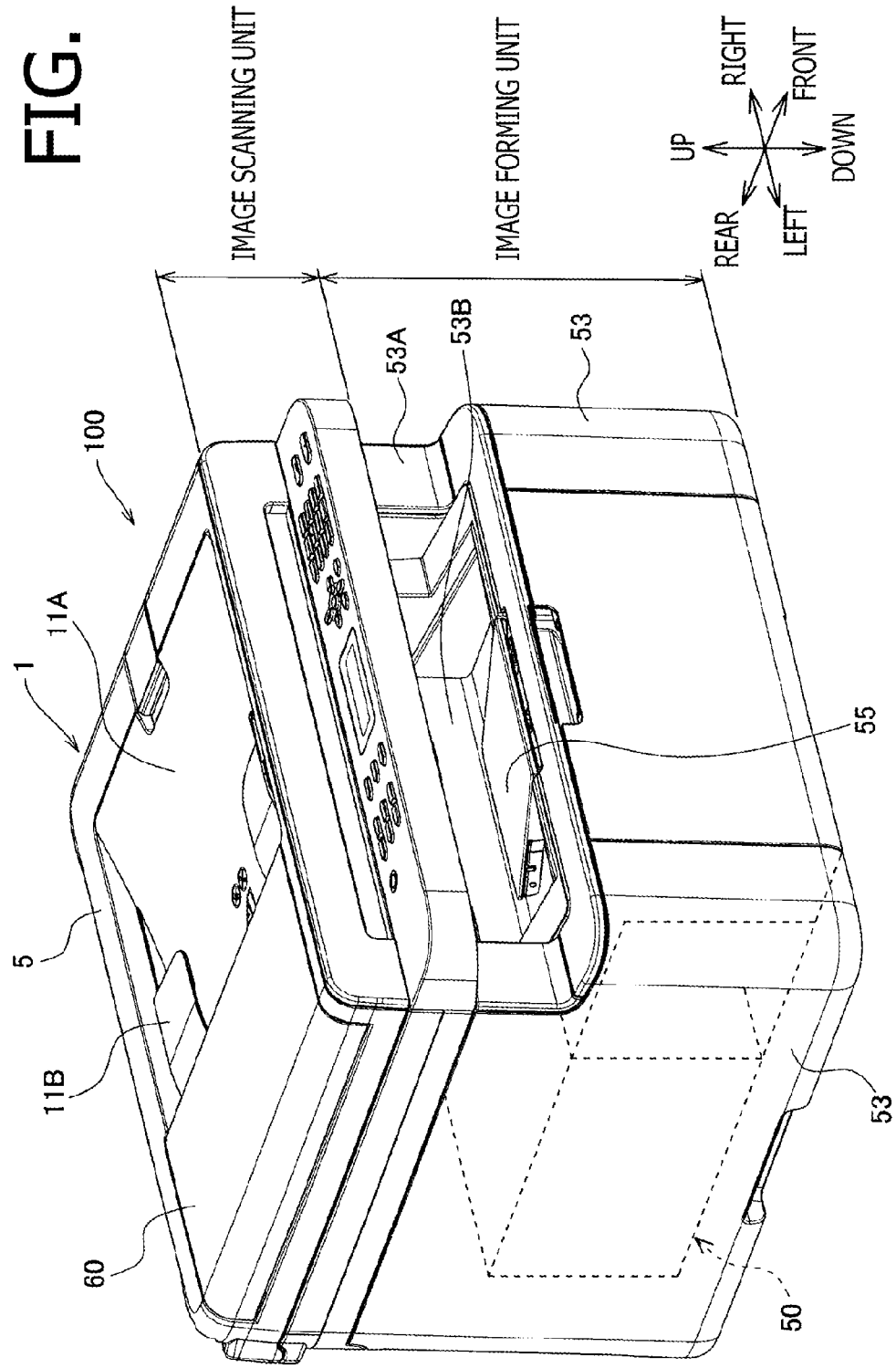
FIG. 1 is a perspective view of an image scanning device, when a sheet cover is closed, according to an embodiment of the invention.

Hereinafter, an exemplary embodiment according to the invention will be described. It should be noted that the exemplary embodiment is merely an example. The invention is defined in claims, and the scope of the invention should not be limited to configurations/operations employed in the exemplary embodiment.

In the accompanying drawings, arrows are indicated to show directions to ease understanding of the directional/positional relationship among the drawings. Further, in the following description, each of portions, components and etc. to which reference numerals are assigned is to be considered such that at least one of the same is provided, unless explicitly stated that the portions, components, and etc. should be plural.

1. Image Forming Apparatus

An image forming apparatus 100 according to the present invention includes an image scanning unit 1 and an image forming unit 50, which are integrally formed to be a single apparatus. The image forming unit 50 is accommodated in a casing 53. On an upper surface of the casing 53, a joint cover 53A is provided. The joint cover 53A connects the image scanning unit 1 and the image forming unit 50 side of the casing 53 with a clearance 53B therebetween.

The image forming unit 50 is configured to form an image on a sheet. The sheet, on which the image is formed by the image forming unit 50, is discharged into the clearance 53B and placed on a discharge tray 55 defined on the upper surface of the casing 53. It is noted that, according to the exemplary embodiment, the image forming unit 50 employs an electro-photographic image forming method for transferring developing agent on the sheet to develop the image.

2. Image Scanning Unit

Figure 2:
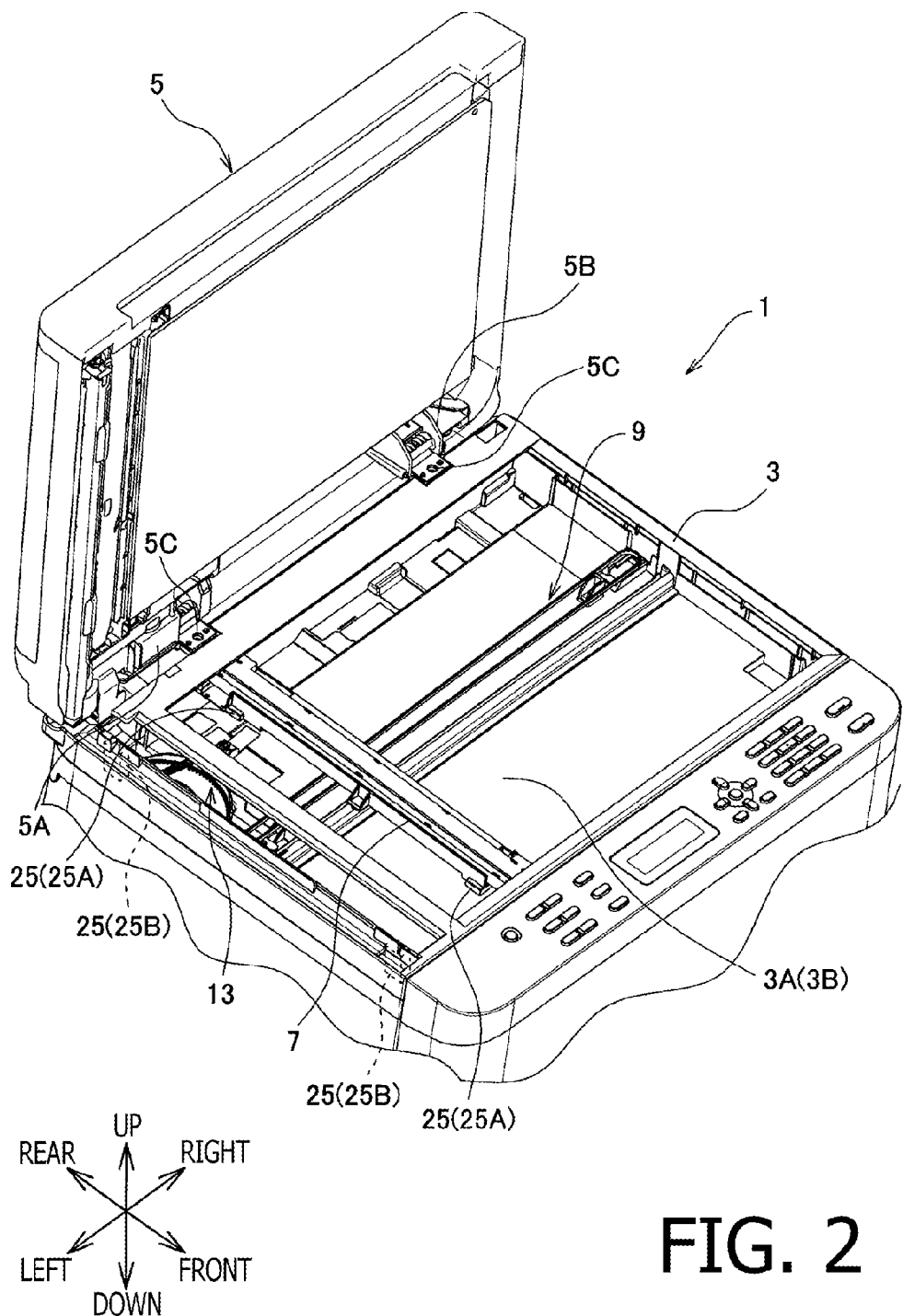
FIG. 2 is a perspective view of the image scanning device, when the sheet cover is opened, according to the embodiment of the invention.

The image scanning unit 1 has functions of scanning an original sheet which is being fed, and scanning the original sheet which is placed on a platen unit 3 (see FIG. 2). The former function (which will be referred to as a conveyed sheet scanning function) is a function to scan an image on the original sheet while it is being conveyed inside the image scanning unit 1. The latter (which will be referred to as a placed sheet scanning function) is a function to scan an image on the original placed on a sheet placement surface 3A of the platen unit 3.

On the platen unit 3, a first scanning window is formed, in which a transparent platen 3B made of a glass or acrylic plate is fitted. The sheet placement surface 3A is defined by the platen 3B. On an upper side of the platen unit 3, a sheet cover 5 is coupled with use of a plurality of hinge mechanisms 5A and 5B.

Each of the plurality of hinge mechanisms 5A and 5B are fixed on the platen unit 3 with screws 5C. The sheet cover 5 is displaceable between a covering position at which the sheet covers 5 covers the platen unit 3 as shown in FIG. 1 and an open position at which the sheet cover 5 is spaced from the platen unit 3 as shown in FIG. 2. When a scanning is executed using the placed sheet scanning function, it is necessary that the user manually opens the sheet cover 5 upward, and places an original sheet on the sheet placement surface 3A.

Below the sheet placement surface 3A, an imaging unit 7, which is configured to be movable along the sheet placement surface 3A, is provided. The imaging unit 7 receives light, which is emitted to the sheet and reflected thereby, and generates electrical signals based on the received light. The image scanning unit 1 scans an image and/or text formed on the original sheet and converts the same to the electrical signals with use of the imaging unit 7.

According to the exemplary embodiment, as the imaging unit 7, a CIS (contact image sensor) is employed. The CIS (i.e., imaging unit 7) is arranged, immediately below the sheet placement surface 3A, such that a longitudinal direction thereof extends in a direction perpendicular to the moving direction of the imaging unit 7.

Figure 3:
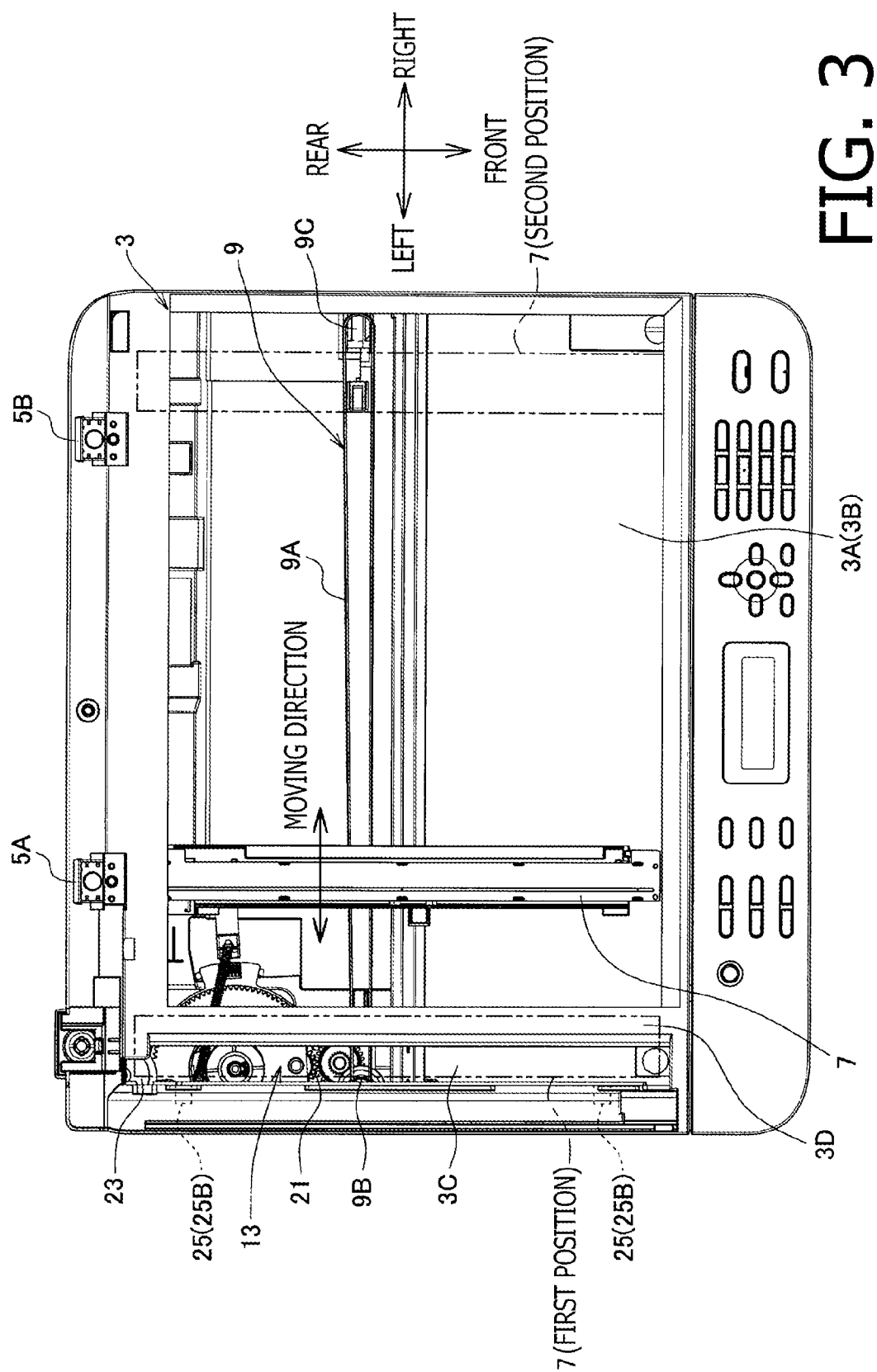
FIG. 3 is a plan view of a platen unit of the image scanning device with the sheet cover being removed.

The imaging unit 7 is coupled to the platen unit 3, as shown in FIG. 3, such that the imaging unit 7 is movable in a direction of the longer side of the sheet placement surface 3A.

According to the exemplary embodiment, a moving mechanism 9 is provided to move the imaging unit 7 between a first position and a second position.

The first position is defined at one end, in the movable direction of the imaging unit 7, and the second position is defined at an opposite end, in the movable direction of the imaging unit 7. According to the exemplary embodiment, the longer side direction of the sheet placement surface 3A coincides with the right-and-left direction of the image scanning unit 1, and the imaging unit 7 is movable in the right-and-left direction.

The moving mechanism 9 includes a first toothed pulley 9B, a second toothed pulley 9C and a toothed belt 9A. The first toothed pulley 9B and the second toothed pulley 9C are rotatably secured on the platen unit 3. The toothed belt 9A is wound and bridged between the first and second toothed pulleys 9B and 9C. The toothed belt 9A is driven by the first toothed pulley 9B to move.

The imaging unit 7 is connected to the toothed belt 9A. Therefore, the imaging unit 7 moves in accordance with a rotating (moving) direction of the toothed belt 9A. The first toothed pulley 9B is arranged at one end portion along the movable direction of the imaging unit 7, and the second toothed pulley 9C is arranged at an opposite end portion along the movable direction of the imaging unit 7.

When the conveyed sheet scanning function is being used, the imaging unit 7 is kept stayed at a position immediately below the second scanning window 3C, and scans the image on the sheet through the second scanning window 3C. When the placed sheet scanning function is being used, the imaging unit 7 moves below the sheet placing surface 3A to scan the image of the sheet which is placed on the sheet placement surface 3A.

According to the exemplary embodiment, the second scanning window 3C is configured such that a transparent (e.g., glass) platen is fitted in an opening, similar to the sheet placement surface 3A. The sheet placement surface 3A and the second scanning window 3C are separated by a beam-like separating member 3D.

At a boundary between the sheet placement surface 3A and the second scanning window 3C, and at a portion facing the imaging unit 7, an adjustment reference 3E is defined. The adjustment reference 3E is used to readjust standard for color and contrast when scanning is performed, and a reference position of the imaging unit 7.

Specifically, the adjustment reference 3E is configured to have a white part 3F extending in an extending direction (i.e., the front-and-rear direction in the exemplary embodiment) of the imaging unit 7, and black parts 3G formed on both sides, in the extending direction of the white part 3F. A controller 30, which will be described later, executes scanning using scanned data obtained by scanning the white part 3F as reference data for the color and contrast.

Further, the controller 30 controls rotation of a drive source 31, or the moving mechanism 9 by determining, based on the boundaries between the white part 3F and the black parts 3G, a stand-by position (i.e., a home position) at which the imaging unit 7 is located at its stand-by state.

It is noted that the stand-by position is defined closer to the second position than the first position. The adjustment reference 3E is arranged on a position closer to the second position than the stand-by position. Thus, the first position, the stand-by position, the adjustment reference 3E and the second position are aligned in this order from one end to the other end of the movable direction of the imaging unit 7.

Figure 4:
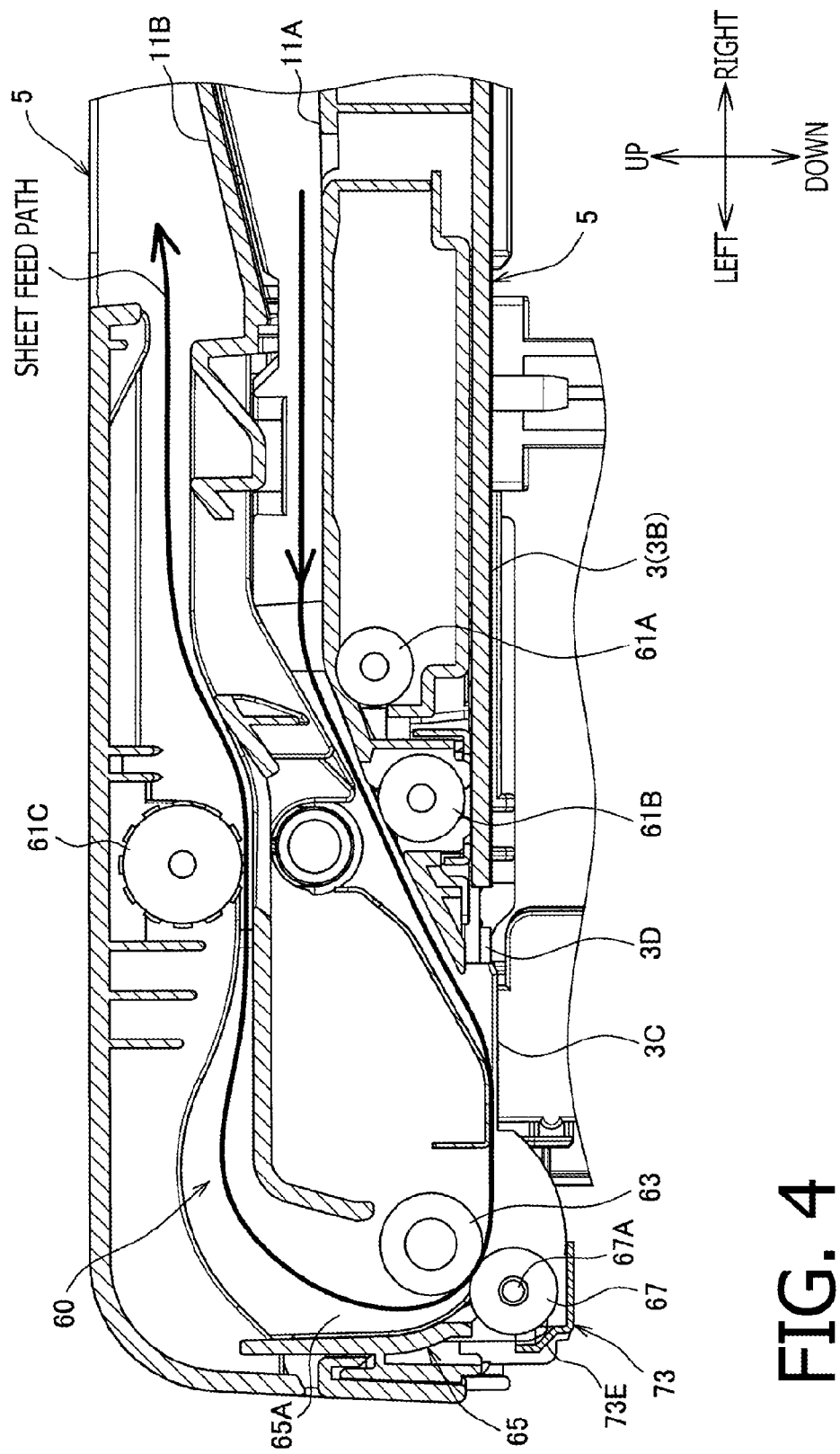
FIG. 4 is a cross-sectional view schematically showing a sheet feed mechanism of the image scanning device according to the embodiment of the invention.
Figure 5:
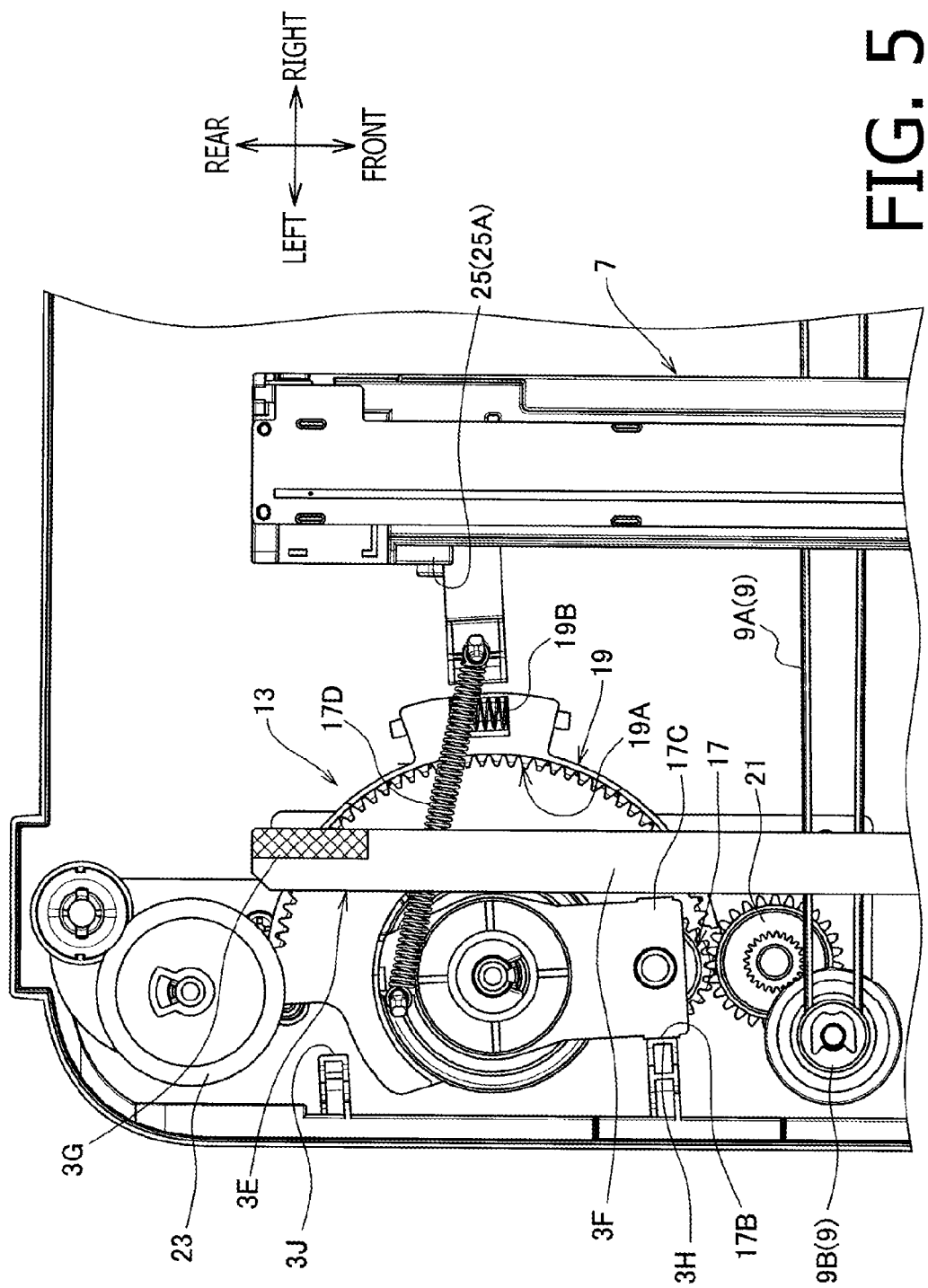
FIGS. 5-9 are cross-sectional views each illustrating a structure and operation of a driving force transmitting mechanism according to the embodiment of the invention.

On the sheet cover 5, a feeding mechanism 60 is provided as shown in FIG. 4. The feeding mechanism 60 is an automatic document feeder which feeds the original sheet toward the second scanning window 3C when the conveyed sheet scanning function is being used.

The feeding mechanism 60 feeds, one by one, the original sheets (e.g., one or a plurality of sheets) stacked in a sheet tray 11A toward the second scanning window 3C, and also feeds the original sheet having been scanned to a discharge tray 11B one after another.

The feeding mechanism 60 includes a pickup roller 61A, a separation roller 61B, a separation pad (not shown), conveying rollers 63 and discharge rollers 61C.

The pickup roller 61A picks up the original sheet stacked in the sheet tray 11A and send the same toward the separation roller 61B.

When more than one original sheets are conveyed in overlaid manner to the separation roller 61B, the separation roller 61B separates the original sheets and sends the same to the second scanning window one by one. The conveying rollers 63 contact the original sheet having passed over the second scanning window 3C and rotates to further feed the original sheet.

The original sheet to which a conveying force is applied by the conveying rollers 63 is directed to a guide member 65, at which the feeding direction is turned, and then conveyed toward the discharge tray 11B by the discharge rollers 61C. The guide member 65 is for guiding a feeding direction of the original sheet, and serves as a feeding chute which is a part of a sheet feed path 65A of the original sheet.

Pinch rollers 67 are arranged to face the conveying rollers 63. The pinch rollers 67 are configured to urge the original sheet, which is being conveyed, toward the conveying rollers 63. That is, the pinch rollers 67 are displaceably supported so that the pinch rollers 67 can move in a separating/approaching direction in which the pinch rollers 67 can approach to or separated from the conveying rollers 63. The separating/approaching direction is a direction substantially parallel with a line, on a plane perpendicular to a rotational axis of the conveying rollers 63 and rotational axes of the pinch rollers 67, connecting the rotational axis of the conveying rollers 63 and the rotational axis of the pinch rollers 67.

An elastic member 67A elastically applies an urging force to the pinch rollers 67 so that the pinch rollers 63 are urged toward the conveying rollers 63. According to the exemplary embodiment, the elastic member 67A is an elastically deformable shaft-like member, and which also serves as a shaft supporting the pinch roller 67. Both longitudinal ends of each shaft-like elastic member 67A are supported by the guide member 65. According to the exemplary embodiment, the shaft-like elastic member 67A is a coil spring having closely wound wire.

In a state where the pinch rollers 67 contact the conveying rollers 63, the elastic members 67A are bent so that the pinch rollers 67 are urged toward the conveying rollers 63. Since the pinch rollers 67 contact the conveying rollers 63 with the elastic force applied by the elastic members 67A, the pinch rollers 67 are displaceable in a direction of moving away from the conveying rollers 63.

3. Driving Force Transmitting Mechanism

According to the exemplary embodiment, the moving mechanism 9 and the feeding mechanism 60 are driven with a single driving source 31. Specifically, a driving force transmitting mechanism 13 selectively transmits the driving force generated by the driving source 31 (e.g., a electric motor) to the moving mechanism 9 or the feeding mechanism 60.

The driving force transmitting mechanism 13 according to the exemplary embodiment has a planetary gear mechanism which includes a sun gear 15, a planetary gear 17, and an engaging portion 19. The sun gear 15 rotates without being displaced from the platen unit 3.

The sun gear 15 receives a driving force from the driving source 31 and rotates. The rotation direction of the sun gear 15 changes in accordance with the rotation direction of the driving source 31. According to the exemplary embodiment, the driving source 31 is arranged in a space located on an opposite side of a space on the sheet placement surface 3A with the sun gear 15 located therebetween. In other words, according to the exemplar embodiment, the driving source 31 is arranged in a space on a lower side with respect to the sun gear 15.

Figure 6:
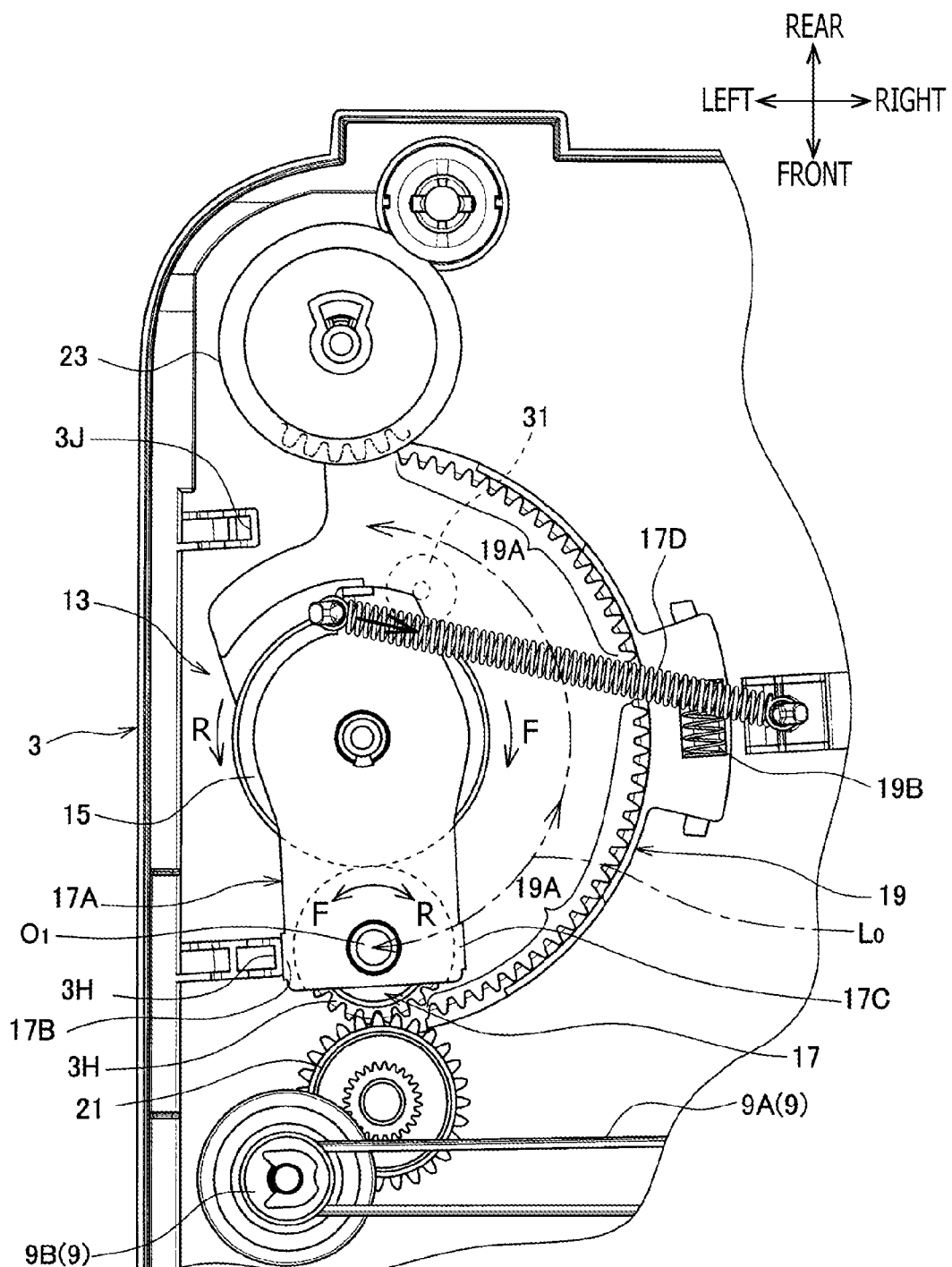
Figure 7:
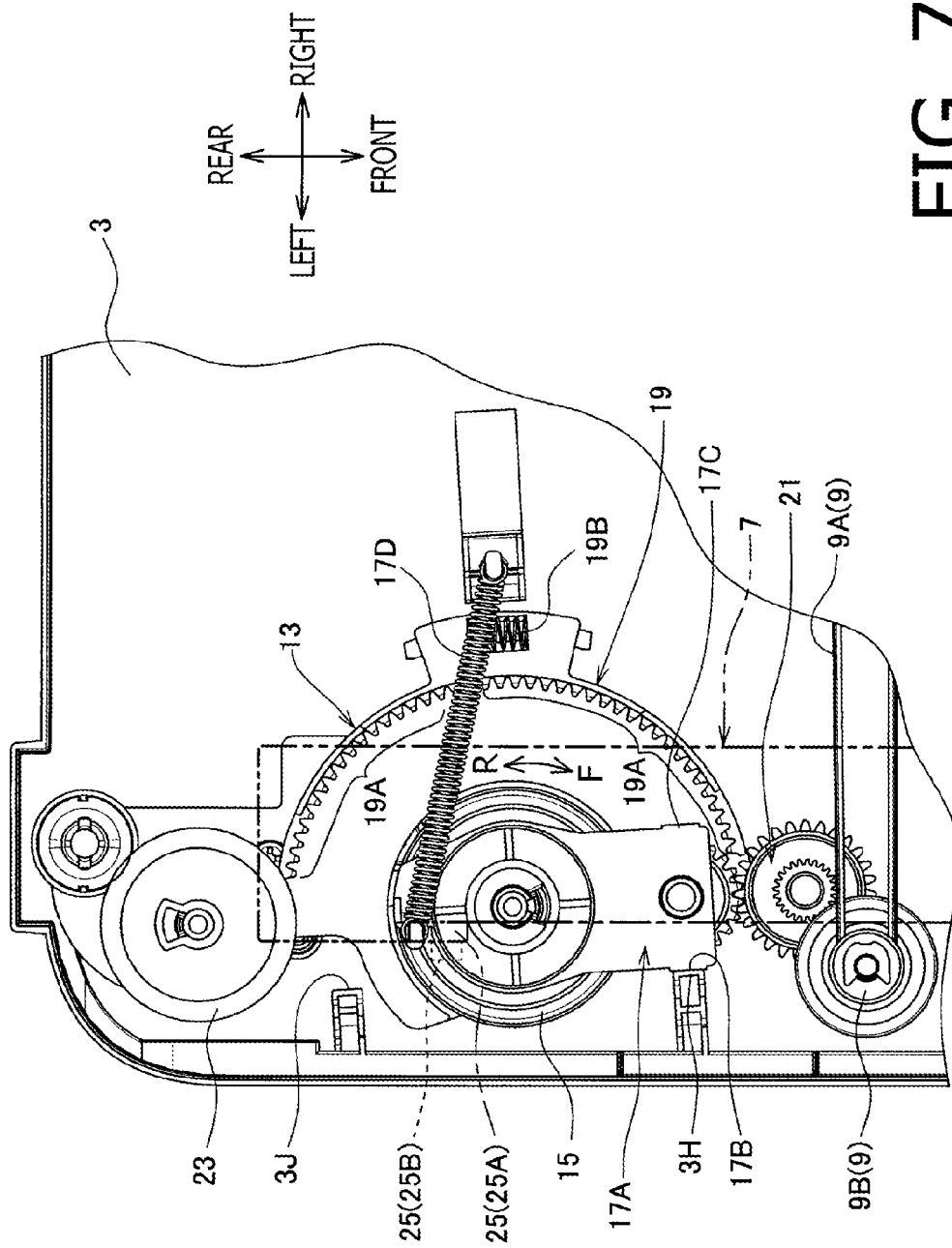
Figure 8:
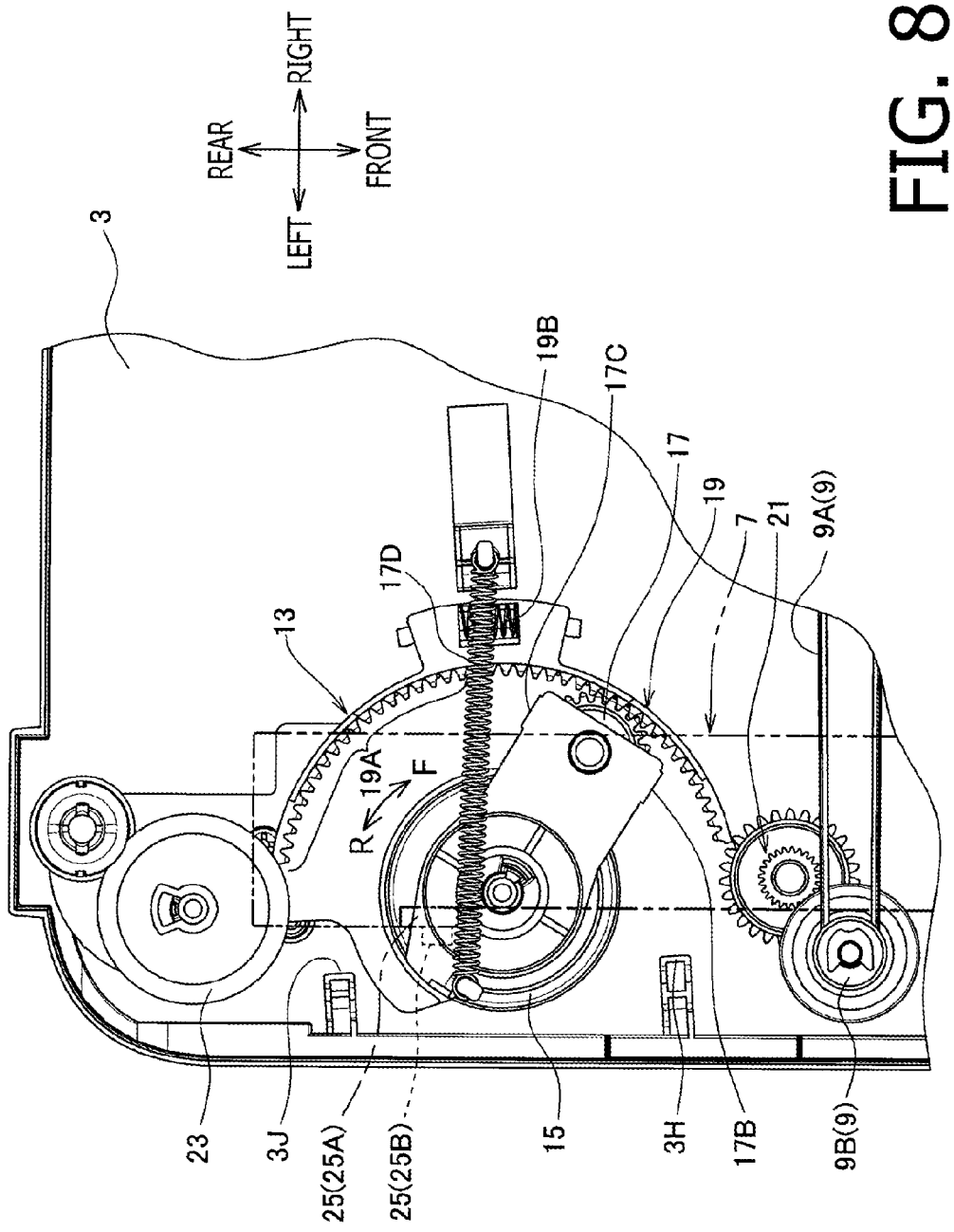
Figure 9:
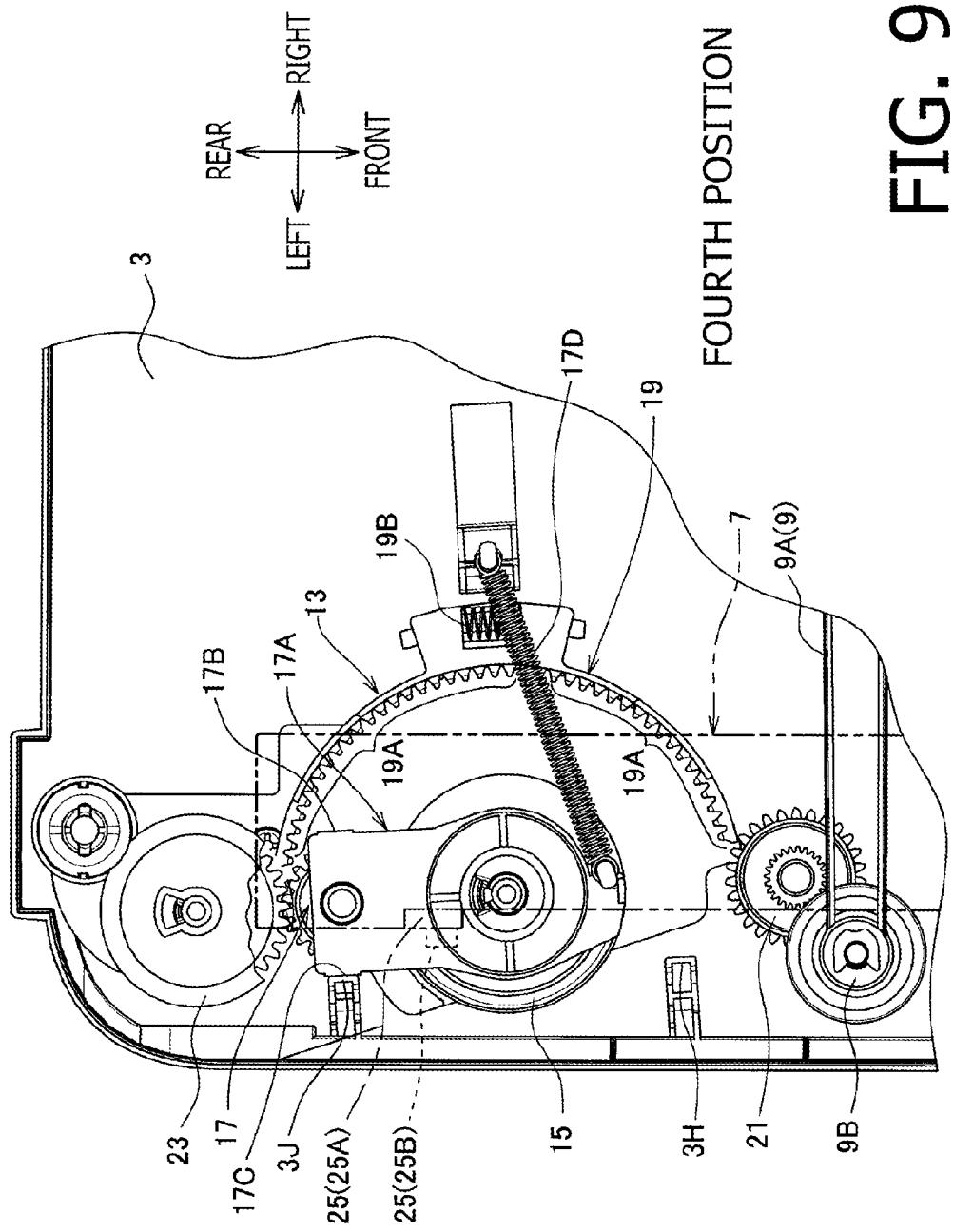

The planetary gear 17 rotates as it engages with the sun gear 15. Further, the planetary gear 17 is configured to make an orbital motion about the center of the rotation of the sun gear 15 such that the center O1 of rotation of the planetary gear 17 moves between a third position as shown in FIG. 6 and a fourth position as shown in FIG. 9. In the following description, the rotation of the planetary gear 17 about the center O1 will be referred to as an axial rotation of the planetary gear 17.

When the sun gear 15 rotates, a force which causes the planetary gear 17 to make the axial rotation (which will be referred to as an axial rotation force), and a force which causes the planetary gear 17 to make the orbital motion are applied to the planetary gear 17 (which will be referred to as an orbital motion force). Therefore, when the sun gear 15 rotates forwardly, the orbital motion force causing the planetary gear 17 to move from the fourth position to the third position (i.e., a clockwise force in FIG. 6) is applied to the planetary gear 17.

When the sun gear 15 is rotating reversely, the orbital motion force causing the planetary gear 17 to move from the fourth position to the third position (i.e., a counterclockwise force in FIG. 6) is applied to the planetary gear 17. When the orbital motion force becomes relatively strong, the planetary gear 17 makes the orbital motion in a direction of the orbital motion force. If the orbital motion force is relatively small, the planetary gear 17 makes the axial rotation (self-rotation), without making the orbital motion.

In the following description, a direction of the axial rotation of the planetary gear 17 when the sun gear 15 forwardly rotates will be referred to as a forward direction of the axial rotation of the planetary gear 17. Similarly, a direction of the axial rotation of the planetary gear 17 when the sun gear 15 reversely rotates will be referred to as a reverse direction of the axial rotation of the planetary gear 17.

An arm 17A supports the planetary gear 17 allowing the planetary gear 17 to make the axial rotation and the orbital motion. An end portion of the arm 17A in its extending direction is supported rotatably about an axis which is the same rotational axis of the sun gear 15. The other end portion of the arm 17A in the extending direction rotatably supports the planetary gear 17.

On the platen unit 3, a second stopper part 3H and a third stopper part 3J which restrict the rotation of the arm 17A are provided. On the arm 17A, a second contact part 17B and a third contact part 17C which are configured to contact the second stopper part 3H and the third stopper part 3J, respectively, are formed.

The second stopper part 3H contacts the second contact part 17B when located at the third position (see FIG. 6) to restrict the clockwise rotation, in this figure, of the arm 17A. The third stopper part 3J contacts the third contact part 17C when located at the fourth position (see FIG. 9) to restrict the counterclockwise rotation, in this figure, of the arm 17A.

A first spring 17D restricts the planetary gear 17 from disengaged from the first output gear 21 when the sun gear 15 is reversely rotating. In other words, the first spring 17D applies a force preventing the planetary gear 17 located at the third position from making the orbital motion toward the fourth position. Hereinafter, such a force will be referred to a first restriction force.

Incidentally, the first spring 17D according to the exemplary embodiment is an extension spring. One end portion in the extending direction of the first spring 17D is connected to a part of the arm 17A opposite to the planetary gear 17 with the center of rotation of the arm 17A located therebetween. Further, the other end of the first spring 17D is connected to the platen unit 3.

With the above configuration, the first spring 17D applies a restriction force (which will be referred to as a second restriction force) restricting the orbital motion of the planetary gear 17 from the fourth position toward the third position to the arm 17A.

When the planetary gear 17 is located at the fourth position, as will be described later, the planetary gear 17 is applying the driving force to the feeding mechanism 60, and the sun gear 15 is reversely rotating. When the sun gear 15 is reversely rotating, a force causing the planetary gear 17 to make the orbital motion from third position to the fourth position is applied. Therefore, according to the exemplary embodiment, at least a period during which the driving force is applied to the feeding mechanism 60, that is, when the sun gear 15 is reversely rotating as engaged with the second output gear 23, the planetary gear 7 stays at the fourth position.

According to the exemplary embodiment, a torque for restricting the orbital motion, which is applied by the first spring 17D to the planetary gear 17 when located a the third position, is greater than a torque for restricting the orbital motion applied by the first spring 17D to the planetary gear 17 when located at the fourth position.

Specifically, the positions of the one and the other ends of the first spring 17D are designed so that the deformation amount of the first spring 17D when located at the third position is greater than the deformation amount when located at the fourth position.

The engaging portion 19 is a portion to be engaged with the teeth of the planetary gear 17 when the planetary gear 17 makes the orbital motion between the third position and the fourth position. Specifically, according to the exemplary embodiment the engaging portion 19 is formed to be an internally-toothed gear. In following description, the engaging portion 19 is occasionally referred to as the internally-toothed gear 19.

The internally-toothed gear 19 has, as shown in FIG. 6, a plurality of protrusions 19A which are protruded on the sun gear 15 side, and the protruded portions 15A are arranged along a path Lo of the orbital motion of the planetary gear 17.

The internal-toothed gear 19 is coupled to the platen unit 3 such that the internal-gear 19 is movable relative to the sun gear 15. Specifically, according to the exemplary embodiment, the internally-toothed gear 19 is displaceable in a direction along the path Lo of the orbital motion of the planetary gear 17 centering about the sun gear 15. There is provided a second spring 19B which returns the internally-toothed gear 19 to a position where the internally-toothed gear 19 was located before the displacement above.

The driving force transmitting mechanism 13 has the first output gear 21 and the second output gear 23, which are configured to engage with the planetary gear 17. The second output gear 23 is arranged on the hinge mechanism 5A side with respect to the first output gear 21 in a direction perpendicular to the moving direction of the imaging unit 7 from among directions parallel with the sheet placement surface 3A.

Thus, the first output gear 21 is arranged at an opposite side to the second output gear with the sun gear 15 therebetween. The rotation axes of the sun gear 15, the planetary gear 17, and the first and second output gears 21 and 23 are perpendicular to the sheet placement surface 3A.

Further, the first output gear 21 engages with the planetary gear 17 when located at the third position as shown in FIG. 6. Therefore, when the planetary gear 17 is located at the third position, the driving force is transmitted through the sun gear 15, the planetary gear 17 and the first output gear 21 in this order. Then, by the first output gear 21, a first toothed-pulley 9B is driven, thereby the moving mechanism 9 operates.

The moving mechanism 9 moves the imaging unit 7 from the first position side toward the second position side when the sun gear 15 is forwardly rotating, while the moving mechanism 9 moves the image unit 7 from the second position side toward the first position when the sun gear 15 is reversely rotating. Thus, the moving direction of the imaging unit 7 changes depending on the rotation direction of the sun gear 15.

The second output gear 23 engages with the planetary gear 17 when located at the fourth position as shown in FIG. 9. Therefore, when the planetary gear 17 is located at the fourth position, the driving force is transmitted through the sun gear 15, the planetary gear 17 and the second output gear 23 in this order, thereby the feeding mechanism 60 operates.

Further, as shown in FIG. 2, a load generating unit 25, which is configured to increase a rotational resistance to the first output gear 21, is provided as shown in FIG. 2. The load generating unit 25 increases the rotational resistance to the first output gear 21 more when the imaging unit 7 is located at the first position than when the imaging unit 7 is located at a position other than the first position.

Specifically, according to the exemplary embodiment, the load generating unit 25 includes a first contact part 25A provided to the imaging unit 7 and a first stopper part 25B provided to the platen unit 3. The first contact part 25A and the first stopper part 25B contact each other as shown in FIG. 9.

When the sun gear 15 is reversely rotating, and if the imaging unit 7 is located at the first position, the first contact part 25A and the first stopper part 25B contact and the movement of the imaging unit 7 is restricted, thereby the rotational resistance of the first output gear 21 is increased.

4. Transmission of Driving Force

Figure 10:
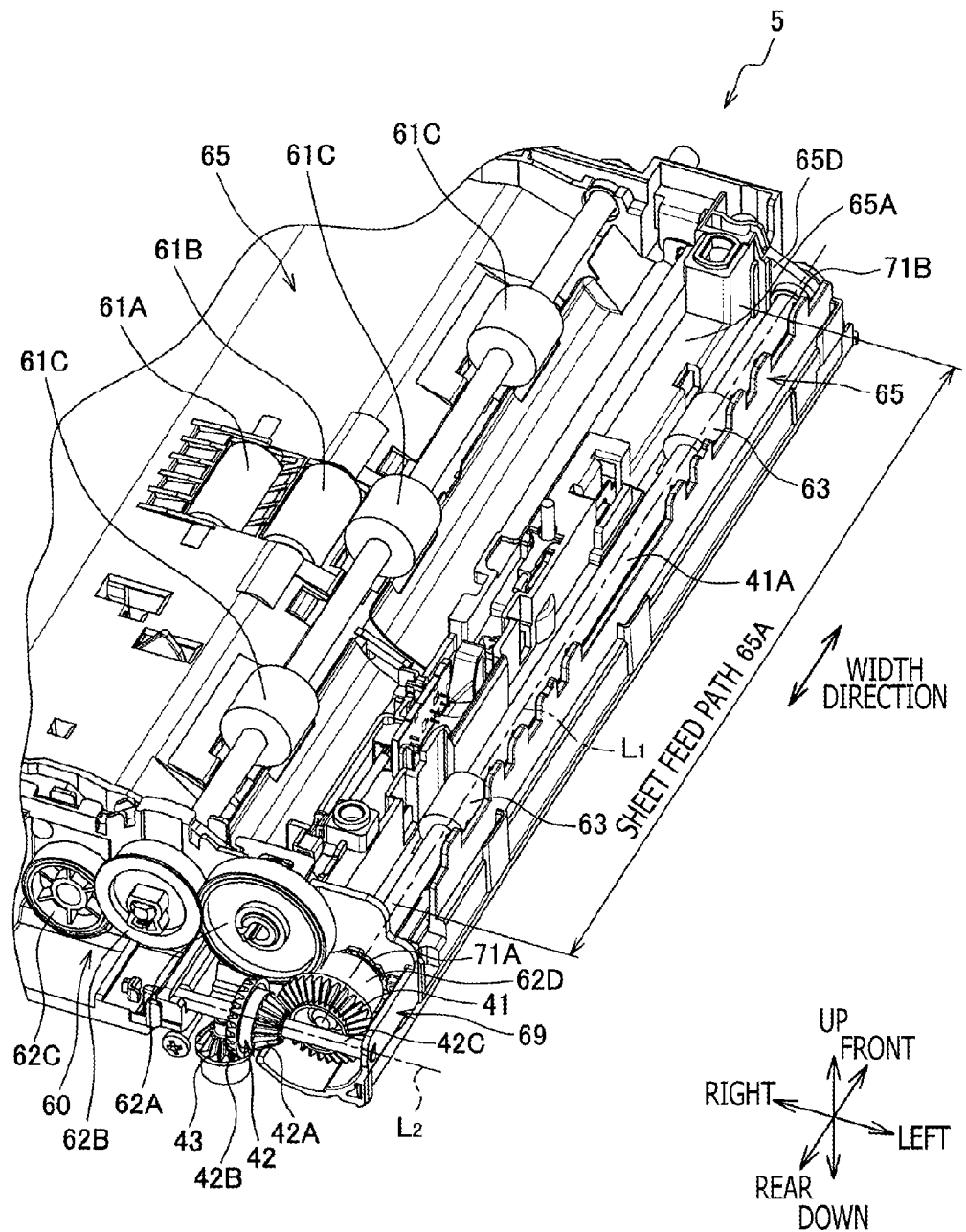
FIG. 10 is a perspective view of a sheet feed mechanism of the image scanning device according to the embodiment of the invention.

The driving force transmitted to the second output gear 23 through the driving force transmitting mechanism 13 is further transmitted to the sheet feeding mechanism 50 through, at least, the first gear 41, the second gear 42 and the third gear 43 as shown in FIG. 10.

That is, in a force transmitting path from the second output gear 23 to the conveying rollers 63, the first gear 41, the second gear 42 and the third gear 43 are arranged from the upstream to downstream such that the third gear 43 is arranged on the downstream of the second output gear 23, the second gear 42 is arranged on the downstream of the third gear 43, and the first gear 41 is arranged on the downstream of the second gear 42.

According to the exemplary embodiment, the first gear 41, the second gear 42 and the third gear 43 are cone-shaped bevel gears. Therefore, at a position where the third gear 43 engages with the second gear 42, and a position where the second gear 24 engages with the first gear 41, a transmission path changes its extending direction by 90 degrees.

Figure 11:
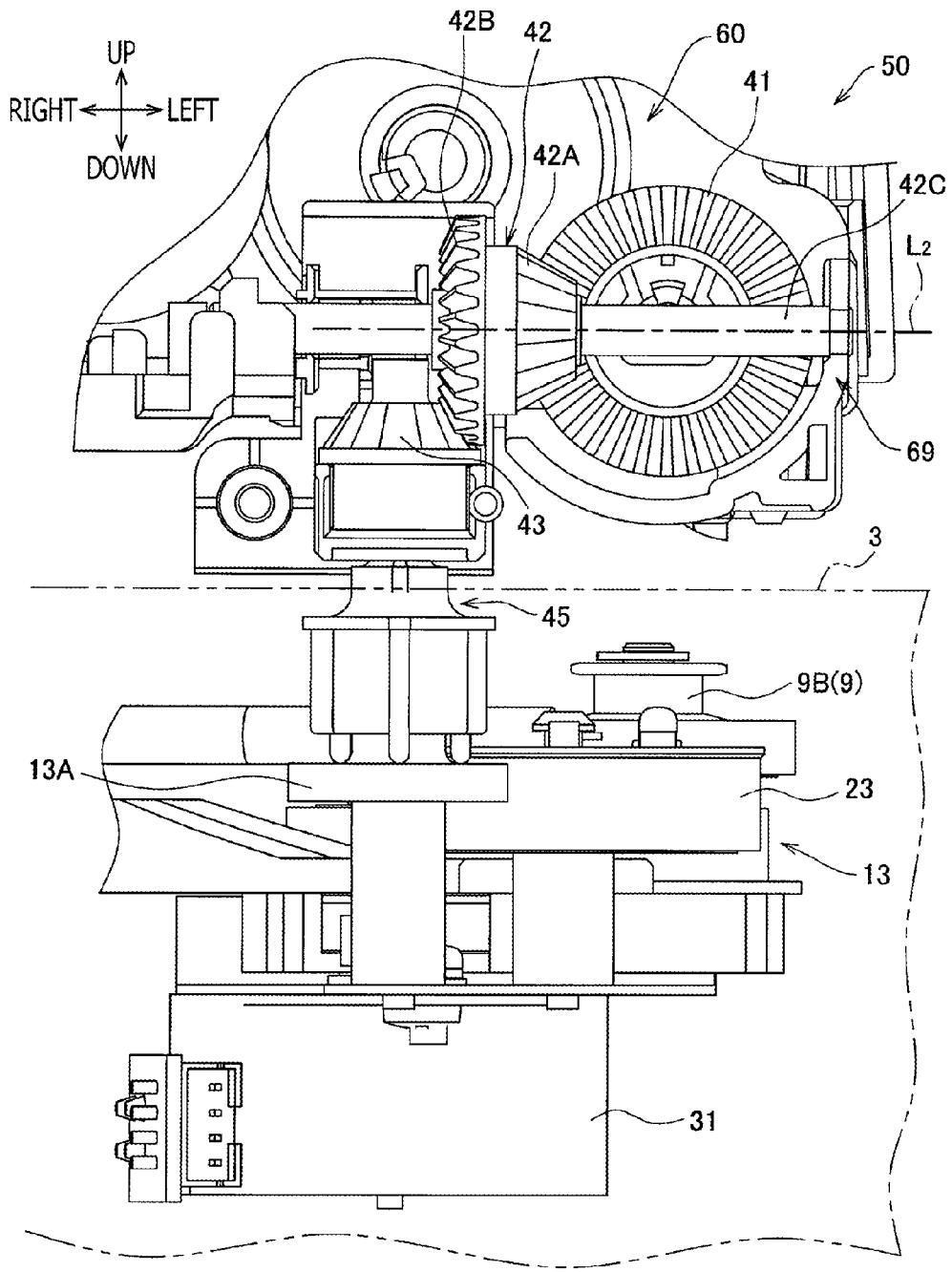
FIG. 11 shows a transmitting path of a driving force from a driving force transmitting mechanism to the sheet feed mechanism.

According to the exemplary embodiment, the second gear 42 is configured such that the first bevel part 42A and the second bevel part 42B are integrated in one gear 42. The first bevel part 42A engages with the first gear 41, and the second bevel part 42B engages with the third gear 43 as shown in FIG. 11.

The second bevel part 42B are formed on a rear surface side of the first bevel part 42A. The first bevel 42A and the second bevel 42B have a common central axis L2 of rotation. Incidentally, the driving force is output from an output part 13A of the driving force transmission mechanism 13 to the third gear 43 via a joint part 45 which includes a universal joint.

The first gear 41 is supported by a first supporting shaft 41A made of metal, as shown in FIG. 10. The first supporting shaft 41A extends in a direction parallel with a width direction of the sheet feed path 65A. The width direction of the sheet feed path 65A is a direction perpendicular to a direction in which a sheet is fed through the sheet feed path, and perpendicular to a thickness direction of the sheet. According to the exemplary embodiment, the width direction of the sheet feed path 65A coincides with a front-and-rear direction of the image forming apparatus 100.

The first gear 41 is integrally formed at a longitudinal end portion of the first supporting shaft 41A. The conveying rollers 63 are arranged at positions displaced, with respect to the first gear 41, on the other end side, in the longitudinal direction, of the first supporting shaft 41A. With this configuration, the first gear 41, the first supporting shaft 41A and the conveying rollers 63 rotate integrally.

A second supporting shaft 42C supports the second gear 42. The second supporting shaft 42C extends in a direction perpendicular to the longitudinal direction of the first supporting shaft 41A and parallel with the sheet placement surface 3A. That is, a central axis L1 of the rotation of the first supporting shaft 41A and a central axis L2 of the rotation of the second supporting shaft 42C intersects perpendicularly.

The second support shaft 42C is supported by a holder unit 69 which configures a driving frame. The holder unit 69 is provided at one end side in the width direction of the sheet feed path 65A, that is on the first gear 41 side. Both longitudinal end sides of the second support shaft 42C are coupled to the holder unit 69 in an unmovable manner. With this configuration, the second gear 42 rotates with contacting the outer circumferential surface of the second support shaft 42C.

The holder unit 69 rotatably supports a plurality of gears 62A-62C, which transmits the driving force transmitted to the first gear 41 to the pickup roller 61A, the separation roller 61B and the discharge roller 61C.

The gear 62A engages with the gear 62B, and the gear 62B engages with the gear 62C. Further, the gear 62A engages with the gear 62D which rotates integrally with the first gear 41. Therefore, the driving force transmitted to the first gear 41 is transmitted to the gears 62A-62C through the gear 62D. According to the embodiment, the gears 62A-62D are spur gears.

The holder unit 69 is made of resin. The holder unit and the guide member 65 are non-integral members formed separately. The holder unit 69 is fixedly secured to the guide member 65 such that the holder unit 69 has a predetermined positional relationship with the guide member 65.

Figure 12:
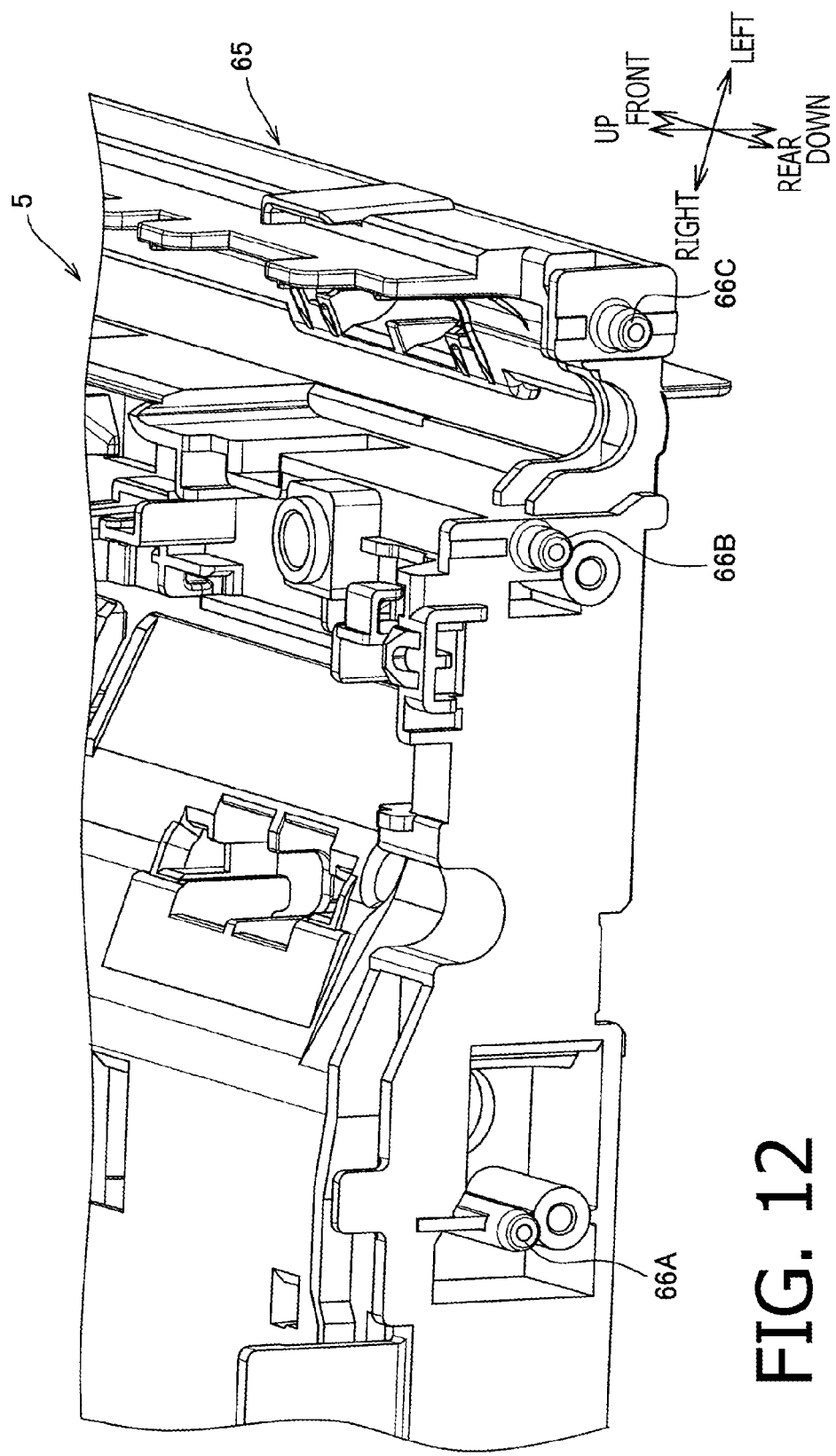
FIG. 12 is a partial perspective view of the image scanning device showing a state where a holder unit is removed from a guiding member.
Figure 13:
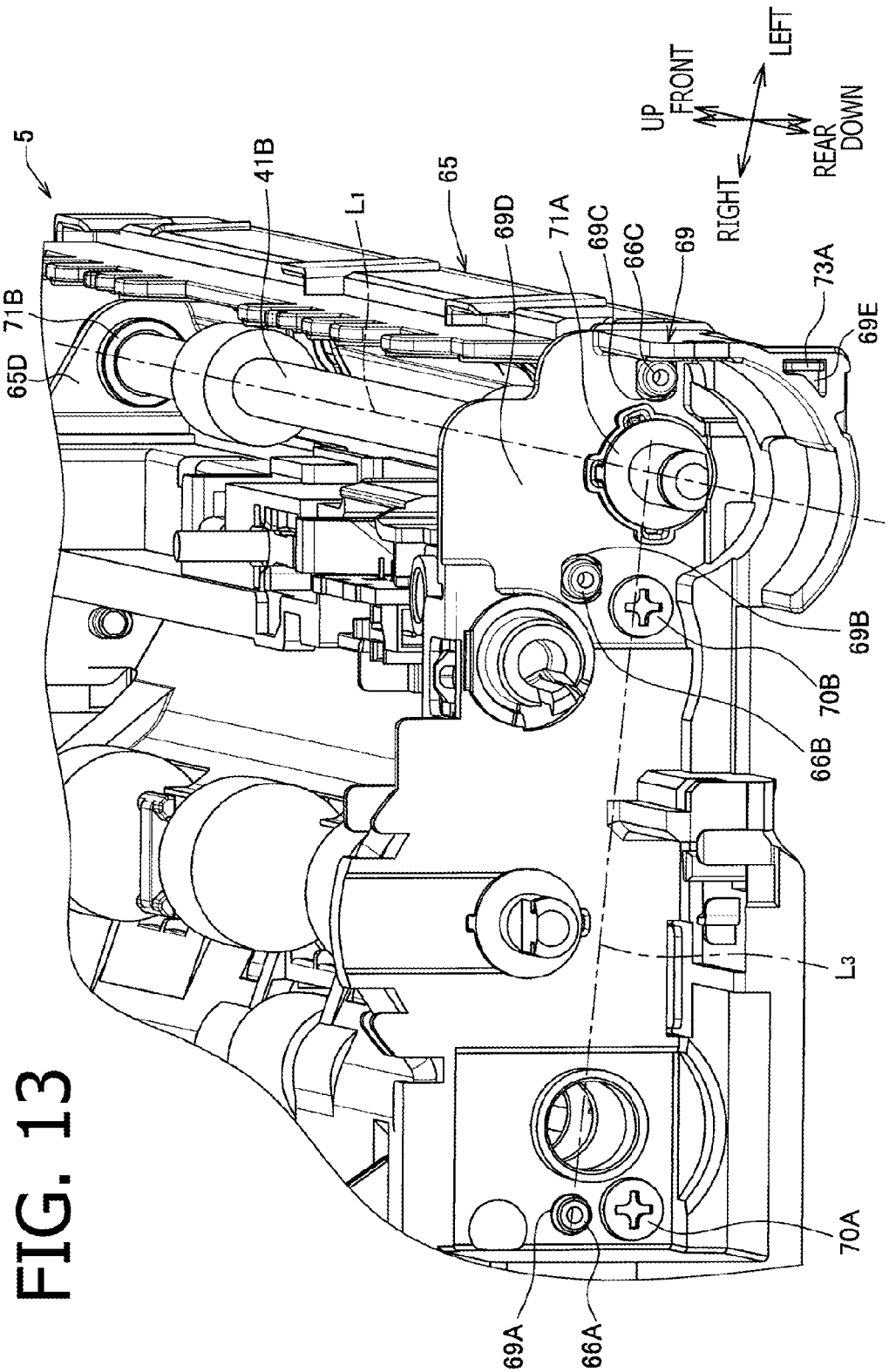
FIG. 13 is a partial perspective view of the image scanning device showing a state where a first gear and the like are removed from the holder unit.

Specifically, as shown in FIG. 12, the guide member 65 is formed with a first protruding part 66A, a second protruding part 66B and a third protruding part 66C which are protruded on the holder unit 69 side. As shown in FIG. 13, on a wall part 69D, which faces the guide member 65, of the holder unit 69 is formed with a first recess 69A, a second recess 69B and a third recess 66C in which the first, second and third protruding parts 66A, 66B and 66C are to be inserted, respectively.

A first screw 70A and a second screw 70B are used to fixedly secure the holder unit 69 to the guide member 65.

Specifically, the first screw 70 is arranged in the vicinity of the first protruding part 66A, that is, at a position closer to the first protruding part 66A than to the second protruding part 66B or the third protruding part 66C. The second screw 70B is arranged in the vicinity of the second protruding part 66B. That is, the second screw 70B is arranged at a position closer to the second protruding part 66B than to the first protruding part 66A or the third protruding part 66C.

The first protruding part 66A, the second protruding part 66B and the third protruding part 66C are cylindrical (cylindrical column like, or cylinder hollow like) protruding part, and formed integrally with the guide member 65. The first recess 69A, the second recess 69B and the third recess 69C are through holes penetrating the wall part 69D.

The first recess 69A is a circular hole having an inner diameter same as an outer diameter of the first protruding part 66A. The first protruding part 66A is arranged farther, with respect to a portion where the first supporting shaft 41A is arranged, than the second protruding part 66B and the third protruding part 66C.

The second recess 69B is an elongated circular (elliptical) hole of which an inner diameter in the up-and-down direction is the same as an outer diameter of the second protruding part 66B. The third recess 69C is an elongated circular (elliptical) hole of which an inner diameter in the up-and-down direction is the same as an outer diameter of the third protruding part. According to the exemplary embodiment, the up-and-down direction is parallel to a line orthogonal to a line L3 extending from the first protruding part 66A to the rotational center axis L1, and orthogonal to the central axis L1.

Thus, when the first protruding part 66A is fitted in the first recess 69A, an initial position with respect to the guide member 65 is defined. Further, as the second protruding part 66B is fitted in the second recess 69B, a rotational movement of the holder unit 69 about the first recess 66A in the up-and-down direction is restricted.

The second protruding part 66B and the second recess 69B are arranged on a side opposite to the third protruding part 66C and the third recess 69C with respect to the first supporting shaft 41A. Specifically, the third protruding part 66C and the third recess 69C are arranged on the pinch roller 67 side with respect to the first supporting shaft 41A, while the second protruding part 66B and the second recess 69B are arranged on a side opposite to the pinch rollers 67 with respect to the first supporting shaft 41A.

A difference in size between the second protruding part 66B and the second recess 69B in the up-and-down direction is slightly smaller than that between the third protruding part 66C and the third recess 69C in the up-and-down direction. Therefore, a position of the guide member 65 on the third protruding part 66C side is restricted with respect to the second protruding part 66B by the holder unit 69.

The first supporting shaft 41A extends from a portion corresponding to one end side in the width direction of the sheet feed path 65A to a portion corresponding to the other end of the sheet feed path 65A. That is, the first supporting shaft 41A extends from one end side to the other end side of the guide member 65 in the width direction.

The holder unit 69 is provided with a first bearing 71A, which holds one longitudinal end portion of the first support shaft 41A. That is, the first bearing 71A is provided at a portion corresponding to one side end in the width direction of the sheet feed path 65A.

At a portion corresponding to the other end, in the width direction of the sheet feed path 65A, of the guide member 65 (i.e., the other side portion of the guide member 65), a second bearing 71B configured to hold the other longitudinal end of the first supporting shaft 41A is provided.

According to the exemplary embodiment, the first bearing 71A and the second bearing 71B are sliding bearing units which slidably contact the circumferential surface of the first supporting shaft 41A. The first bearing 71A is a through hole formed on the holder unit 69, and the second bearing 71B is a through hole formed on the guide member 65.

Figure 14:
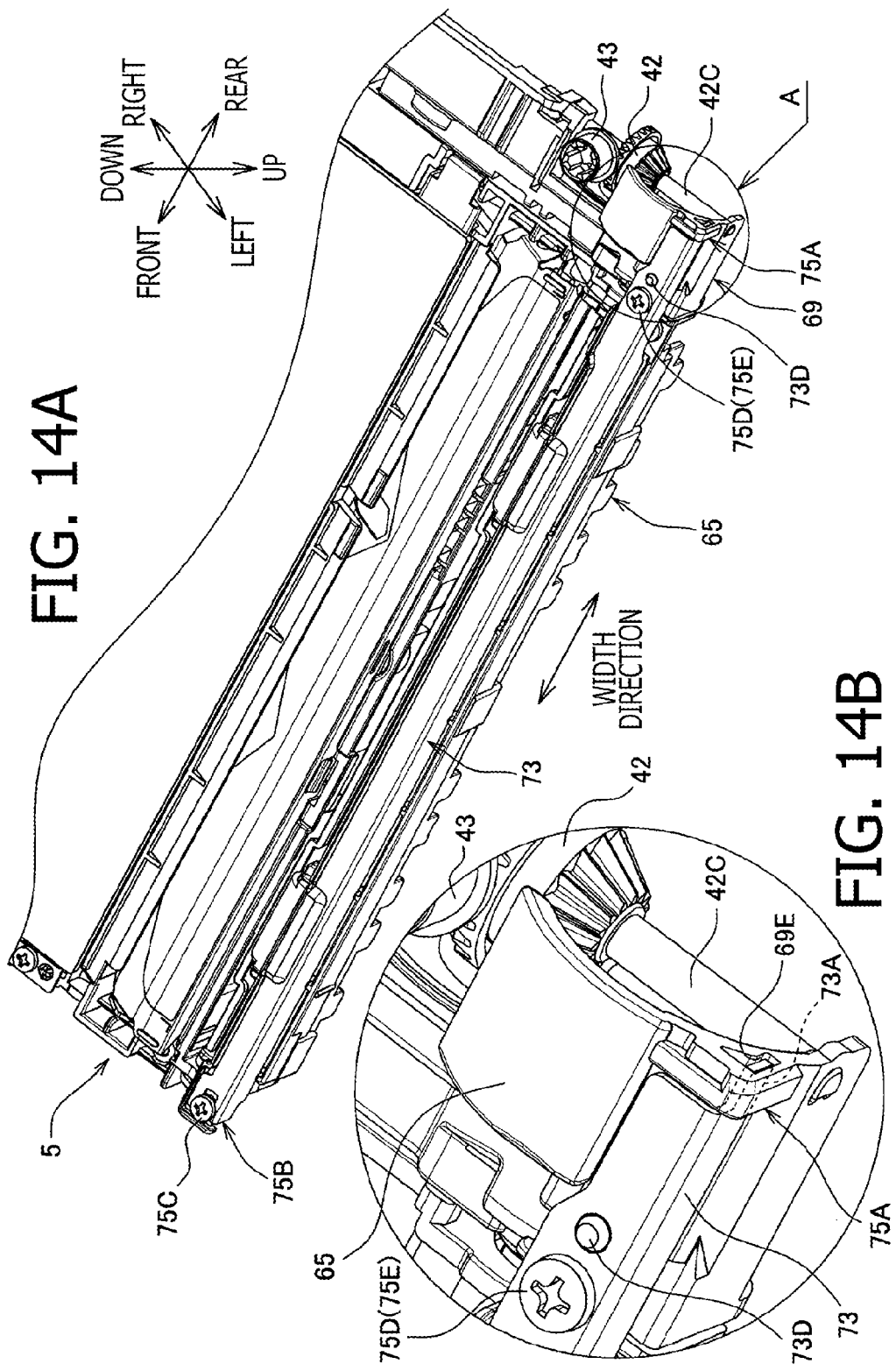
FIG. 14A is a perspective view of a part of a sheet cover viewed from the below.
FIG. 14B is a partially enlarged view of a circled part of FIG. 14A.
Figure 15:
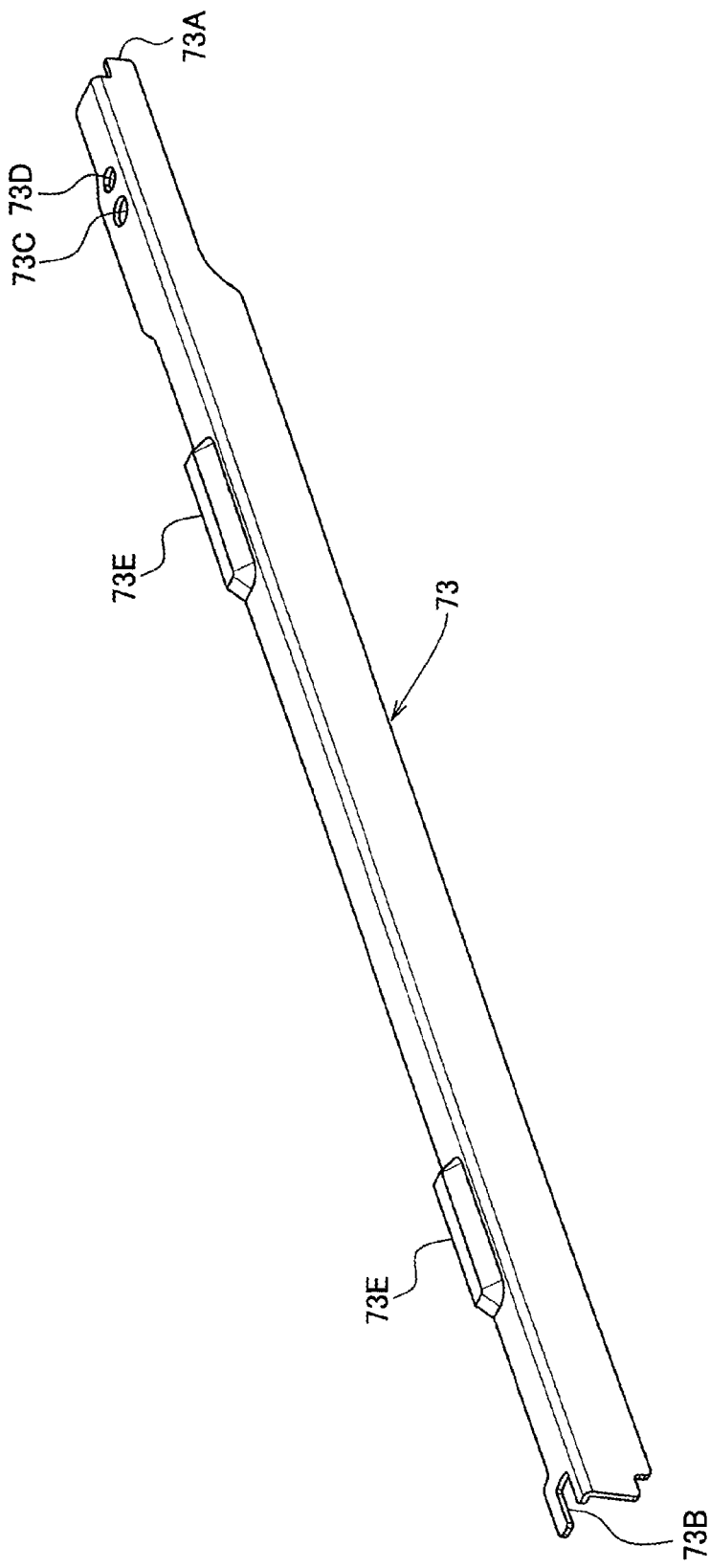
FIG. 15 is a cross-sectional view of a reinforce member according to the embodiment of the invention.
Figure 16:
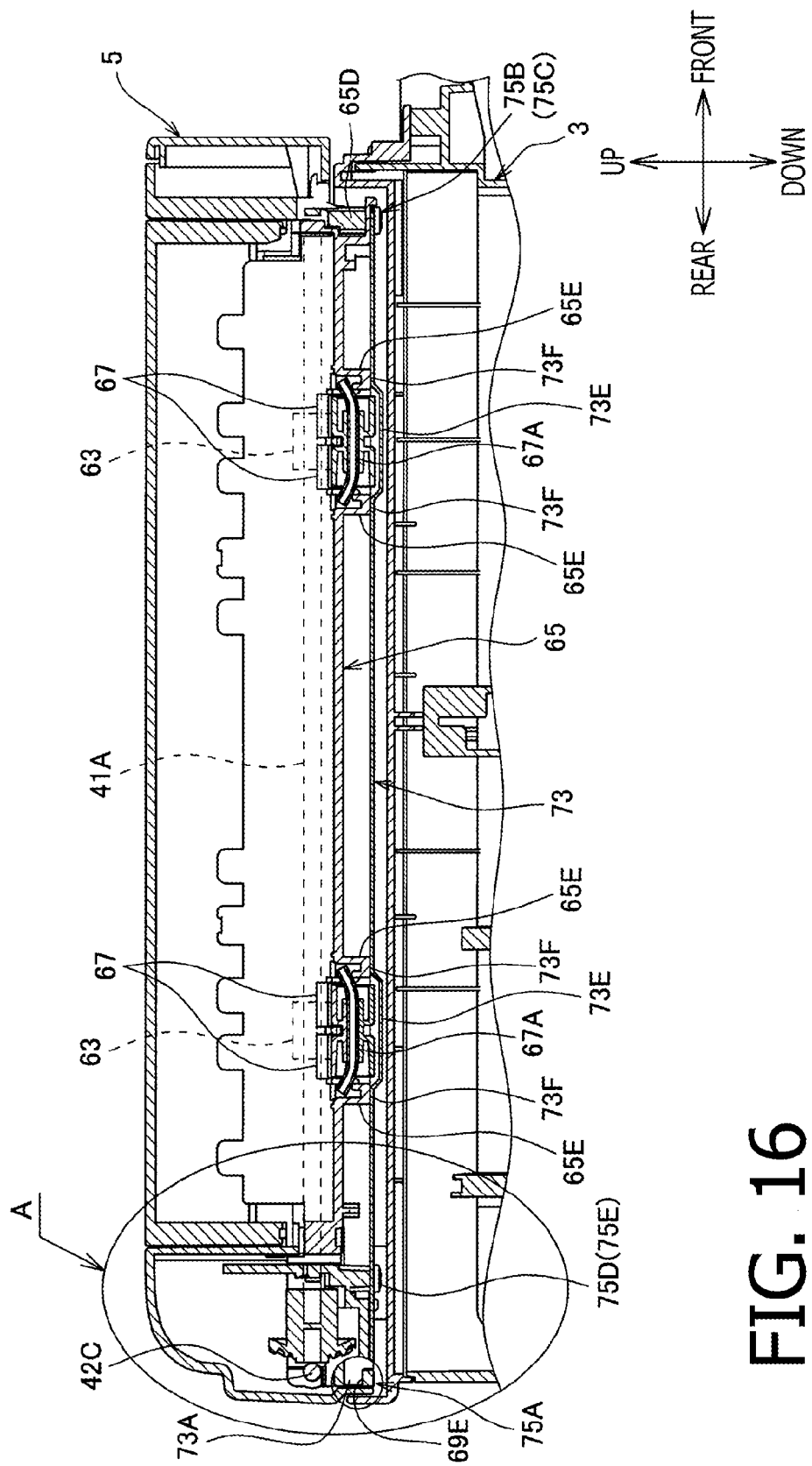
FIG. 16 is a cross-sectional view of the image scanning device including a cross-sectional view of a pinch roller, an elastic member and the like according to the embodiment of the invention.

On the lower surface of the guide member 65, a reinforce member 73 made of metal and extending in the width direction is provided as shown in FIG. 14A. The reinforce member 73 is formed such that a shape thereof in a cross section on a plane perpendicular to the longitudinal direction thereof is substantially L-shaped as shown in FIG. 15. According to the exemplary embodiment, the reinforce member 73 is formed such that a plastic forming process such as a press molding process is applied to a steel plate such as an SPCC (steel plate cold commercial) and formed to be L-shaped.

At one longitudinal end portion of the reinforce member 73, a first fixing unit 75A that fixedly secures the one longitudinal end portion of the reinforce member 73 to the holder unit 69 is provided as shown in FIG. 14A. At the other longitudinal end portion of the reinforce member 73, a second fixing part 75B that fixedly secures the other longitudinal end portion of the reinforce member 73 to the guide member 65 is provided.

The first fixing unit 75A is a plug-in type in which, as shown in FIG. 14B, an insertion part 73A is inserted in an insertion hole 69E. According to the exemplar embodiment, the insertion hole 69E is provided to the holder unit 69. The insertion part 73A is, as shown in FIG. 15, provided at a longitudinal end portion of the reinforce member 73.

The second fixing unit 75B is a screw type in which the screw 75C such as a P-screw is adopted, as shown in FIG. 14A. Specifically, as shown in FIG. 15, a hole 73B through which the screw 75C is inserted is formed at the longitudinal end portion of the reinforce member 73.

A portion of the guide member 75 corresponding to the other end in the width direction of the sheet feed path 65A, that is, on the second bearing 71B side of the guide member 65, a female-screw portion (not shown) is formed in which the screw 75C is engaged.

According to the exemplar embodiment, the female-screw portion is formed below the wall part 65D on which the second bearing 71B is provided. That is, the other longitudinal end of the reinforce member 73 extends to a position corresponding to the other end, in the width direction, of the feed path 65A as shown in FIG. 14A. Due to this configuration, the second fixing unit 75B is located at a position corresponding to the other end, in the width direction, of the feed path 65A.

Figure 17:
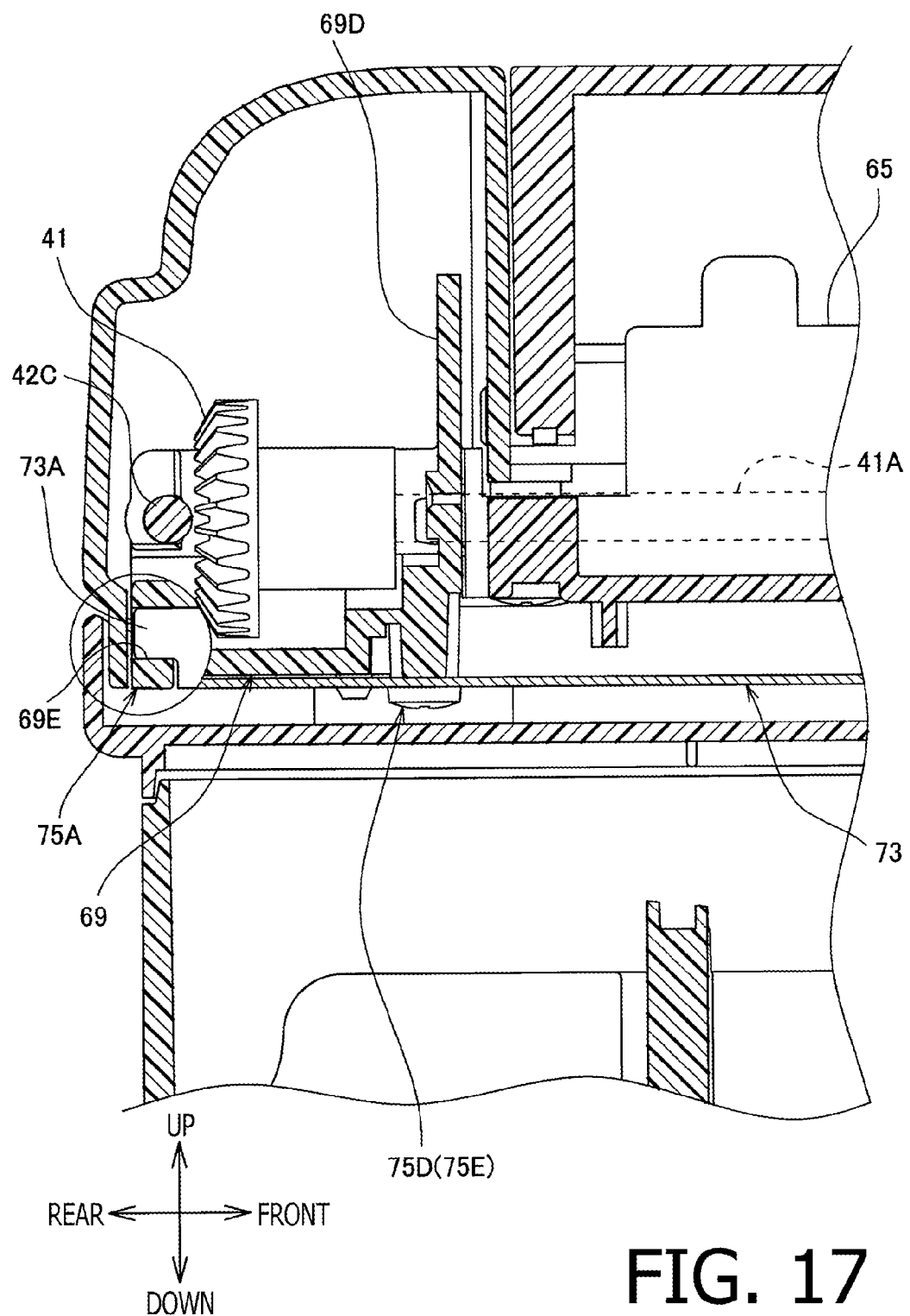
FIG. 17 is a partially enlarged view of a circled part in FIG. 16.

A longitudinal end part of the reinforce member 73, or the insertion part 73A side portion extends at least to a position corresponding to the second support shaft 42C as shown in FIG. 17. It is noted the position corresponding to the second support shaft 42C according to the exemplary embodiment is a position displaced downward from the second support shaft 42C.

Between the first fixing unit 75A and the second fixing unit 75B, a third fixing unit 75D which fixes the reinforce member 73 to the holder unit 69 is provided. The third fixing nit 75D is of a screw-fixing type using a screw 75E such as a P-screw.

On the reinforce member 73, a hole 73C through which the screw 75E penetrates is formed as shown in FIG. 15. A portion of the holder unit 69 corresponding to the first bearing 71A, or a portion below the wall part 9D, a female-screw part (not shown) with which the screw 75E engages is formed as shown in FIG. 17.

Between the hole 73C and the insertion part 73A, a positioning part 73D, which is used when the reinforce member 73 is fixed onto the guide member 65 and the holder unit 69, is provided. The positioning part 73D includes a hole formed on one of the reinforce member 73 and the holder unit 69, and a protrusion, which is to be inserted in the hole, provided to the other of the reinforce member 73 and the holder unit 69.

The reinforce member 73 is arranged to be displaced from the pinch roller 67 in a radial direction. The portion of the reinforce member 73, corresponding to the pinch roller 67, recess portions 73E are formed. The recess portions 73E are formed to be recessed in a direction spaced from the pinch roller 67 as shown in FIG. 4. According to the exemplary embodiment, the recessed portions 73E are formed integrally when the reinforce member 73 is molded.

The reinforce member 73 has load receiving portions 73F, which are configured to receive reaction forces generated on the elastic member 67A. The load receiving portions 73F are formed at portions corresponding to the longitudinal ends of the elastic member 67A which is formed to have a cylindrical shape. Specifically, the load receiving portions 73F are arranged at positions displaced from both ends of the elastic member 67A in a radial direction.

It is noted that the reaction forces generated on the elastic member 67A is an elastic force the elastic member 67A generates, which is a force acting in a direction opposite to a direction in which the elastic members 67A urge the pinch rollers 67 to the conveying rollers 63.

The load receiving portions 73F contact supporting parts 65E provided to the guide member 65. The supporting parts 65E are portion of the guide member 65 and support the longitudinal end portions of the elastic member 67A.

Figure 18:
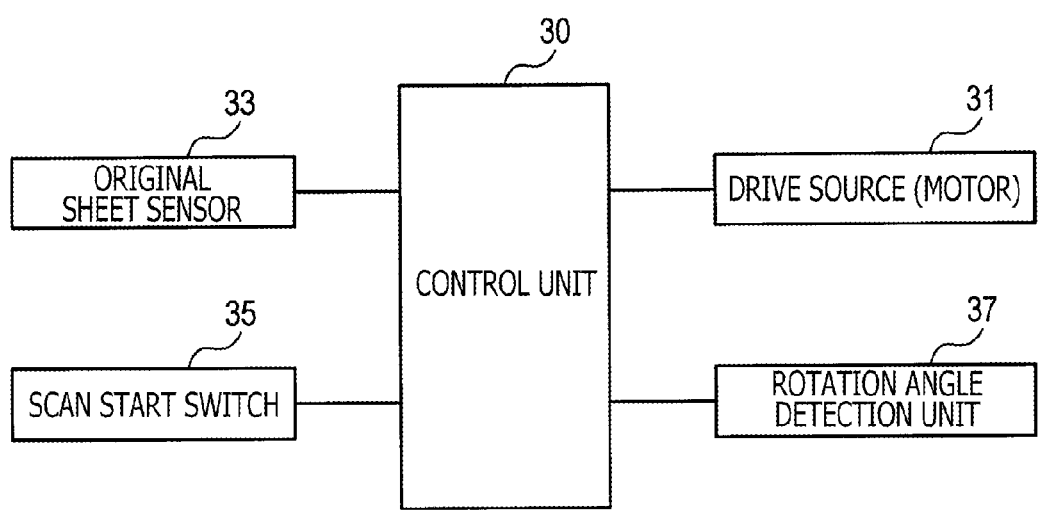
FIG. 18 is a block diagram showing a control system for a driving source according to the embodiment of the invention.

5. Control of Driving Source (see FIG. 18)

The single driving source 31 supplies a driving force to the driving force transmission mechanism 13, or the sun gear 15. A forward rotation, a reverse rotation and a stoppage of the single driving source 31 is controlled by a controller 30. According to the exemplary embodiment, the controller 30 includes a microcomputer which has a CPU (central processing unit), a ROM (read only memory), a RAM (random access memory) and the like.

Programs, parameters and constants used to control an operation of the driving source 31 are stored in a non-volatile storage such as the ROM. The CPU retrieves the programs so that the controller 30 functions.

An original sheet sensor 33 is configured to output a signal representing whether an original sheet is placed in the sheet tray 11A. A scan start switch 35 is an operation member operated by a user. That is, when the user operates the scan start switch 35, a start signal is transmitted to the controller 30. A rotation angle detector 37 is configured to detect a rotation angle of the driving source 30, and transmit the detected angle to the controller 30.

The controller 30 executes scanning in accordance with the conveyed sheet scanning function when the scan start switch 35 is operated with the original sheet being placed in the sheet tray 11A. When the scan start switch 35 is operated without the original sheet being place in the sheet tray 11A, the controller 30 executes scanning in accordance with the placed sheet scanning function.

6. Operation of Driving Source Transmission Mechanism 6.1 Operation in Accordance with the Placed Sheet Scanning Function When the image scanning unit 1 is not operated, the imaging unit 7 is located at a standby position, and the planetary gear 17 is located at the third position. When the scan start switch 35 is operated by the user and the scanning in accordance with the placed sheet scanning function starts, the controller 30 forwardly rotates the driving source 31 to forwardly rotate the sun gear 15.

With the above control, the imaging unit 7 moves from the standby position to the second position (i.e., from the first position side to the second position side). During this movement, the orbital motion force that causes the planetary gear 17 to move from the fourth position to the third position is applied. However, as the second stopper 3H and the second contact part 17B contact each other, the planetary gear 17 does not make an orbital movement and stays the third position to forwardly rotates.

When the detected angle, which is detected by the angle detection unit 37, reaches a predetermined angle, the controller 30 reversely rotates the driving source 31 to reversely rotates the sun gear 15. Further, the controller 30 stops the driving source 31 when the controller 30 judges that the imaging unit 7 has reached the standby position. With this control, the imaging unit 7 moves from the second position side to the standby position.

When the sun gear 15 rotates reversely, an orbital motion force causing the planetary gear 17 from the third position side to the fourth position side, i.e., a force causing the planetary gear 17 to move away from the first output gear 21, acts on the planetary gear 17. However, such an orbital motion force is canceled by the first spring 17D, the planetary gear 17 does not make the orbital motion, but stays at the third position and rotates reversely.

6.2 Operation in Accordance with the Conveyed Sheet Scanning Function

When the image scanning unit 1 is not in use, the imaging unit 7 is located at the standby position, and the planetary gear 17 is located at the third position. When the scan start switch 35 is operated by the user and the scan start instruction has been input, the controller 30 reversely rotates the driving source 31 to reversely rotates the sun gear 15 reversely.

With the above control, the imaging unit 7 moves from the standby position to the first position. When the imaging unit 7 has moved to the first position and the first stopper part 25B contact the first contact part 25A, movement of the imaging unit 7 is restricted and a rotational resistance of the first output gear 21 increases.

As the rotational resistance increases, self-rotation of the planetary gear 17 is prevented, and the self-rotational force decreases. On the other hand, an orbital motion force which causes the planetary gear 17 to make an orbital motion from the third position toward the fourth position is increased. When the orbital motion force exceeds the restriction force applied by the first spring 17D, the planetary gear 17 engages with the inner-teeth gear 19, thereby the planetary gear 17 starts making the orbital motion toward the forth position side.

As the planetary gear 17 makes the orbital motion and the third stopper 3J contacts the third contact 17C, the orbital motion of the planetary gear 17 stops and the planetary gear 17 engages with the second output gear 23 as shown in FIG. 9. Then, the driving force is transmitted to the feeding mechanism 60 and feeding of the sheet is started.

When the controller 30 judges that scanning in accordance with the conveyed sheet scanning function is finished, the controller 30 rotates the driving source 31 forwardly to rotates the sun gear 15 forwardly. Then, the orbital motion force causing the planetary gear 17 from the fourth position side toward the third position side is applied.

When the orbital motion fore exceeds the second restriction force of the first spring 17D, the planetary gear 17 makes the orbital motion toward the third position side. When the planetary gear 17 reaches the third position, the planetary gear 17 engages with the first output gear 21, and the imaging unit 7 moves from the first position toward the reference position side. Therefore the controller 30 stops the driving source 31 when the imaging unit 7 has reached the reference position.

7. Characteristic Features of Image Scanner According to the Exemplary Embodiment According to the exemplary embodiment, the image scanner has a planetary gear mechanism including the sun gear 15, the planetary gear 17 and an inner-toothed gear 19, and transmission of the driving force can be switched by switching the rotation direction of the sun gear 15.

When the planetary gear 17 is making the orbital motion with being separated from the first output gear 21 or the second output gear 23, a load the prevents the self-rotation of the planetary gear 17 becomes smaller. In such a case, the self-rotation force may exceeds the orbital motion force, and the orbital motion may be stopped.

However, according to the exemplary embodiment, since the arm 17A slidably contacts the side surface of the planetary gear 17, a frictional force, which suppresses the self-rotation of the planetary gear 17, is generated if the planetary gear 17 starts self-rotation. Therefore, when the planetary gear 17 is making the orbital motion with being spaced from the first output gear 21 and the second output gear 23, the orbital motion of the planetary gear 17 will not stop.

When the planetary gear 7 engages with the first output gear 21 and the sun gear 15 is reversely rotating, torque of the orbital motion acting on the planetary gear 17 is in an opposite direction to the torque by the first restriction force by the first spring 17D.

Therefore, if the first restriction force is smaller, the planetary gear 17 makes the orbital motion and is spaced from the first output gear 21. In such a case, the imaging unit 7 cannot be moved from the second position side toward the first position side. If the first restriction force is relatively large, the self-rotation force of the planetary gear 17 becomes too large. In such a case, a possibility of a tooth jumping phenomenon between the toothed belt 9A and the first toothed pulley 9B increases.

Therefore, according to the exemplary embodiment, a torque restricting the orbital motion which is applied by the first spring 17D to the planetary gear 17 when located at the third position is designed to be greater than the rotation resisting torque of the first output gear 21 and smaller than the driving torque of the first output gear 21 when the tooth jumping phenomenon occurs between the toothed belt 9A and the toothed pulley 9B.

According to the exemplary embodiment, it is also a characteristic feature that the inner-toothed gear 19 is movable with respect to the sun gear 15. With this configuration, when the planetary gear 17 engages with the inner-toothed gear 19 with being spaced from the first output gear 21 and the second output gear 23, it is possible to make the planetary gear 17 and the inner-toothed gear 19 engage with each other smoothly.

Depending on a timing at which the planetary gear 17 is moved away from the first output gear 21 or the second output gear 23, protruding parts configuring the teeth of the planetary gear 17 and the protrusions 19A configuring the inner teeth 19 may collide and the planetary gear 17 may not engage with the inner-toothed gear 19.

According to the exemplary embodiment, when the protrusions configuring the teeth of the planetary gear 17 and protrusions 19A configuring the inner teeth 19 collide with each other, the teeth of the inner-toothed gear 19 are displaced so that the planetary gear 17 and the inner-toothed gear 19 engage with each other smoothly.

Further, according to the exemplary embodiment, a first collision surface 19E and a second collision surface 19E are formed on the protrusion 19A. With this configuration, according to the exemplary embodiment, when the planetary gear 17 and the inner-toothed gear 19 engage with each other, the protrusions configuring the teeth of the planetary gear 17, and the first collision surface or the second collision surface 19F collide with each other firstly.

Since the protrusions of the planetary gear 17 are slidably displaced with respect to the first collision surface 19E or the second collision surface 19F relatively easily, it is possible to make the planetary gear 17 and the inner-toothed gear 19 engage with each other smoothly when the planetary gear 17 is making the orbital motion.

Further, according to the exemplary embodiment, a third collision surface 17F is formed on the planetary gear 17. With this configuration, the protrusion of the planetary gear 17 or protrusions configuring the first output gear 21 can be slidably displaced easily. Therefore, it is possible to make the planetary gear 17 and the first output gear 21 engage with each other smoothly when the planetary gear 17 is making the orbital motion.

According to the exemplary embodiment, it is a characteristic feature that a forth collision surface 21A is formed on the first output gear 21. With this configuration, the protrusion of the planetary gear or the protrusion configuring the first output gear 21 is slidably displaced easily with respect to the other protrusions. Therefore, when the planetary gear 17 is making the orbital motion, the planetary gear 17 and the first output gear 21 can be engaged with each other smoothly.

If the planetary gear 17 and the first output gear 21 engage with each other with teeth which do not have collision surfaces (hereinafter, such an engagement condition will be referred to a regular engagement condition), a pulsing motion included in the driving force transmitted from the first planetary gear 17 to the first output gear 21 becomes small.

Therefore, as in the exemplary embodiment, the planetary gear 17 and the first output gear 21 have the regular engagement condition when an image is scanned, deterioration of scanned image can be suppressed.

According to the exemplary embodiment, a fifth collision surface 23A is formed on the second output gear 23. With this configuration, the protrusion of the planetary gar 17 or the protrusions configuring the second output gear 23 are displaced with respect to the other protrusion easily. Therefore, when the planetary gear 17 is making the orbital motion, the planetary gear 17 and the second output gear 23 can be engaged with each other smoothly.

<Driving Force Transmission to Feeding Mechanism>

According to the exemplary embodiment, it is a characteristic feature that the first fixing unit 75A which fixes one longitudinal end of the reinforce member 73 to the holder unit 69, and the second fixing unit 75B which fixes the other longitudinal end of the reinforce member 73 on the guide member 65.

With the above configuration, the holder unit 69 according to the exemplary embodiment has a structure reinforced by the reinforce member 73. Further, the reinforce member 73 is fixed to the holder unit 69 and the guide member 65 with being bridged therebetween. Therefore, occurrence of distortion of the holder unit 69 and the guide member 65 can be suppressed.

Further, according to the exemplary embodiment, defect of engagement between the first gear 41 and the second gear 42 can be suppressed. Therefore, occurrence of large noise at the engaging portion between the first gear 41 and the second gear 42 can be suppressed, and the driving force can be transmitted efficiently.

Incidentally, according to an aspect of the invention, one of the first gear 41 and the second gear 42 may be a worm, and the other may be a worm wheel. It is noted, however, by employing conical bevel gears as the first and second gears 41 and 42 as in the exemplary embodiment, it is possible to improve transmission efficiency of the driving force in comparison with a case where the first gear 41 and the second gear 42 are configured by the worm gear and the worm wheel.

According to the exemplary embodiment, the other longitudinal end of the reinforce member 73 extends to a position corresponding to the other end, in the width direction, of the feeding path 65A. Further, it is a characteristic feature that there is provided a third fixing unit 75D, which is a fixing unit provided between the first fixing unit 75A and the second fixing unit 75B, and is configured to fix the reinforce member 73 to the holder unit 69 or the guide member 65.

With this configuration, occurrence of distortion of the holder unit 69 and the guide member 65 can be suppressed. Further, according to the exemplary embodiment, the first bearing 71A which holds the first supporting shaft 41A is provided to the holder unit 69 or the guide member 65. Further, it is a characteristic feature that the third fixing unit 75D is provided at a position corresponding to the first bearing 71A.

With this configuration, according to the exemplary embodiment, a possibility that a force greater than a force applied to other portions is applied to a portion of the holder unit 69 or the guide member 65 where the first bearing 71A is provided is high. Further, according to the exemplary embodiment, at a portion where a relatively great force can be applied, that is, a portion corresponding to the first bearing 71A, the third fixing unit 75D is provided. Therefore, it is ensured that the holder unit 69 or the guide member 65 is reinforced.

Further, according to the exemplary embodiment, the first supporting shaft 41A extends from a portion corresponding to one end, in the width direction, of the feed path 65A to a portion corresponding to the other end. Further, the first bearing 71A is provided at a portion corresponding to the one end, in the width direction, of the feed path 65A.

Further, at a portion, of the guide member 65, corresponding to the other end, in the width direction, of the feed path 6A, the second bearing 71B holding the first support shaft 41A is provided. Further, the second fixing unit 75B is provided at the other end, in the width direction, of the feed path 65A.

With the above configuration, according to the exemplary embodiment, generation of distortion of the guide member 65 can be suppressed. Therefore, the original sheet can be fed smoothly and reliably.

Further, according to the exemplary embodiment, there are provided the pinch rollers 67 which urge the original sheet as fed toward the conveying rollers 63, the elastic members 67A that generates a pressing force to bias the pinch rollers 67 to the conveying rollers 63, and the load receiving portion 73F which is provided to the reinforce ember 73 and receives the reactive force generated on the elastic member 67A generated in association of application of the elastic force.

With this configuration, according to the exemplary embodiment, the reactive force generated by the elastic member 67A can be received by the reinforce member 73 which is made of metal. Therefore, it is possible to suppress generation of relatively large distortion of the guide member 65 in comparison with, for example, a case where on the guide member 65 receives the reactive force generated by the elastic member 67A. With this configuration, it is possible that the original sheet can be fed stably for a relatively long time.

Further, according to the exemplary embodiment, the recess portions 73E, which are formed on the reinforce member 73 at positions corresponding to the pinch rollers 67 and recessed in the direction farther from the pinch rollers 67, are formed.

With this configuration, according to the exemplary embodiment, the reinforce member 73 can be fixed to the guide member 65 without arranging the entire reinforce member 73 largely spaced from the pinch rollers 67.

Further, according to the exemplary embodiment, the recessed portions 73E are formed integrally with the reinforce member 73 with use of plastic forming method such as a press-molding method. With this configuration, it is possible to enlarge second moment of area at the portions where the recessed portions 73E are formed, and thus, it is possible to enlarge bending rigidity of the reinforce member 73.

According to the exemplary embodiment, the reinforce member 73 is configured such that a cross-sectional shape on a plane perpendicular to the longitudinal direction thereof is substantially L-shaped. With this configuration, according the exemplary embodiment, the second moment of area of the reinforce member 73 becomes greater in comparison with a reinforce member which might be configured to have a simple plate-like shape. Therefore, according to the exemplary embodiment, the bending rigidity of the reinforce member 73 can be made relatively high.

Incidentally, according to the exemplary embodiment, the holder unit 69 and the guide member 65 may be formed integrally. When the holder unit 69 and the guide member 65 are not formed integrally as in the exemplary embodiment, it is advantageous if one of the guide member 65 and the holder unit 69 has recessed portions 69A-69C in which protrusions 66A-66C formed on the other of the guide member 65 and the holder unit 69 are fitted.

With such a configuration, it is possible to improve the positioning accuracy of the holder unit 69 with respect to the guide member 65. Accordingly, it is possible to suppress occurrence of defect in engagement between the first gear 41 and the second gear 42.

According to the exemplary embodiment, the second fixing unit 75B employs a screwing method, while the first fixing unit 75A employs an insertion method where the inserting part 73A is inserted in the hole 69E.

With this configuration, according to the exemplary embodiment, an assembling worker can perform an assembling work in accordance with a procedure as follows. That is, the assembling worker first inserts the insertion part 73A i the hole 69E. Then, the assembling worker fastens a screw. According to this procedure, the assembling worker can assemble the reinforce member 73 easily, and increase of number of assembling processes can be suppressed.

Further, according to the exemplary embodiment, one longitudinal end of the reinforce member 73 extends to a portion corresponding to the second supporting shaft 42C of the holder unit 69. With this configuration, according to the exemplary embodiment, it is ensured that the distortion of the holder unit 69 can be suppressed.

According to the exemplary embodiment, the second protrusion 66A and the second recess 69B are formed at portions opposite to the third protrusion 66C and the third recess 69C with the first supporting shaft 41A therebetween.

With this configuration, the guiding member 65 is supported by the second protrusion 66B and the second recess 69B, and the third protrusion 66C and the third recess 69C. Therefore, deformation of the guide member across the age is suppressed. Further, occurrence of defect in engagement between the first gear 41 and the second gear 42 can be suppressed for a long period.

Further, according to the exemplary embodiment, a difference of sizes, in the up-and-down direction, between the second protrusion 66B and the second recess 69B formed on the wall part 69D of the holder unit 69 is relatively small in comparison with a difference of sizes, in the up-and-down direction, between the third protrusion 66C and the third recess 69C.

With this configuration, a position at the third protrusion 66C side of the guide member 65 is restricted with respect to the second protrusion 66B by the holder unit 69. Therefore, enhancement of deformation of the guide member 65 across ages can further be suppressed.

Further, according to the exemplary embodiment, it is a characteristic feature that the first recess 69A, the second recess 69B and the third recess 69C are formed on the wall part 69D of the holder unit 69. That is, the wall unit 69D is a plate-like part and has a relatively high rigidity.

Further, according to the exemplary embodiment, since the first recess 69A, the second recess 69B and the third recess 69C, which are used for positioning, are formed on the wall part 69D which has a relatively high rigidity, it is ensured the deformation of the guide member 65 across the ages can be suppressed.

Further, according to the exemplary embodiment, it is a characteristic feature that the first bearing 71A is provided to the wall part 69D which has the relatively high rigidity. With this configuration, it is ensured that the position of the first bearing 71A is maintained, defects in engagement between the first gear 41 and the second gear 42 can be suppressed for a long period.

Other Embodiments

According to the exemplary embodiment described above, a single driving source 31 is arranged on the platen unit 3, and the driving force is transmitted selectively to one of the moving mechanism 9 and the sheet feed mechanism 60. However, the invention needs not be limited to such a configuration.

For example, dedicated driving sources may be provided for the moving mechanism 9 and the sheet feed mechanism 60, respectively. Alternatively, the driving source 31 may be provided to the sheet cover 5, and the driving force may be selectively transmitted to one of the moving mechanism 9 and the sheet feed mechanism 60.

According to the exemplary embodiment, the first fixing unit 75A employs the insertion method, and the second fixing unit 75B employs the screw method. However, the invention needs not be limited to such a configuration. For example, the first fixing unit 75A is configured to employ the screw method, while the second fixing unit 75B may employ the insertion method. Alternatively, both the first and second fixing units 75A ad 75B may be configured to the screw method or the insertion method.

According to the exemplary embodiment the third fixing unit 75D is provided to the holder unit 69. However, the invention need not be limited to such a configuration. For example, the third fixing unit 75D may be provided to the guide member 65, or the third fixing member 75D may be omitted.

According to the exemplary embodiment, the first fixing unit 75A corresponds to the first fixing unit as set forth in the claims, and the second fixing unit 75B corresponds to the second fixing unit as set forth in the claims. However, the invention need not be limited to such a configuration.

That is, the third fixing unit 75D may be regarded as the first fixing unit set forth in the claims. Alternatively, if the third fixing unit 75D is provided to the guide member 65, the third fixing unit 75D may be regarded as the second fixing unit set forth in the claims.

According to the exemplary embodiment, the first gear 41 and the second gear 42 are bevel gears. However, the invention need not be limited to such a configuration. For example, one of the first gear 41 and the second gear 42 may be a worm gear, and the other may be a worm wheel.

According to the exemplary embodiment, the third fixing unit 75D is provided at a portion corresponding to the first bearing 71A, and the second fixing unit 75B are provided at a portion corresponding to the second bearing 71B. However, the invention need not be limited to such a configuration.

According to the exemplary embodiment, the second protrusion 66A and the second recess 69B are arranged at portions opposite to the third protrusion 66C and the third recess 69C with the first supporting shaft 41A therebetween. However, the invention need not be limited to such a configuration. For example, the second protrusion 66B and the second recess 69B, or the third protrusion 66C and the third recess 69C may be omitted.

According to the exemplary embodiment, three protrusions and corresponding three recesses are provided. However, the invention need not be limited to such a configuration. For example, at least one protrusion and one recess corresponding to the at least one protrusion may be provided.

According to the exemplary embodiment, the first protrusion 66A and the like are provided to the guide member 65, and the first recess 69A (a through-hole type recess) and the like are formed to the holder unit 69. The invention need not be limited to such a configuration. For example, the first protrusion 66A and the like may be provided to the holder unit 69, while the first recess 69A and the like may be provided to the guide member 65. Alternatively, the first recess 69A and the like may be formed as a recessed part instead of a through hole.

According to the exemplary embodiment, a difference of a size, in the up-and-down direction, between the second protrusion 66B formed on the wall part 69D of the holder unit 69 and the second recess 69B is smaller than the difference of a size between the third protrusion 66C and the third recess 69C. However, the invention need not be limited to such a configuration.

Further, according to the exemplary embodiment, the first recess 69A, the second recess 69B and the third recess 69C are formed on the wall part 69D of the holder unit 69. However, the invention need not be limited to such a configuration.

Furthermore, according to the exemplary embodiment, the first bearing 71A is provided on the wall part 69D of the holder unit 69. However, the invention need not be limited to such a configuration.

According to the exemplary embodiment, the insertion hole 69E is formed on the holder unit 69 and the insertion part 73A is formed on one longitudinal end portion of the reinforce member 73. However, the invention need not be limited to such a configuration. For example, the insertion hole 69E may be formed on the reinforce member 73 and the insertion part 73A may be provided to the holder unit 69.

Further, according to the exemplary embodiment the sheet feed direction is changed by the guide member 65. However, the invention need not be limited to such a configuration.

Further, according to the exemplary embodiment, the reinforce member 73 has an L-shaped cross section, and load receiving portion 73F and recesses 73E are provided. However, the invention need not be limited to such a configuration.

According to the exemplary embodiment, the guide member 65 and the holder unit 69 are not formed integrally. However, the invention need not be limited to such a configuration and the guide member 65 and the holder unit 69 may be formed of resin by integral molding.

Further, according to the exemplary embodiment, the first gear 41, the first supporting shaft 41A and the conveying rollers 63 are formed integrally and rotate at the same time. However, the invention need not be limited to such a configuration. For example, the shaft of the conveying rollers 63 and the first supporting shaft 41A may be formed as different shafts, as the shaft of the discharge roller 61C, and the driving force is transmitted from the first gear 41 to the sheet conveying rollers 63 with use of a gear or a belt.

According to the exemplary embodiment, the driving force transmitting mechanism 13 includes the planetary gear mechanism having the planetary gear 17 and the inner-toothed gear 19. However, the invention need not be limited to such a configuration, and a driving force transmission mechanism may be configured to switch a transmission path with use of an actuator such as a solenoid.

According to the exemplary embodiment, the inner-toothed gear 19 includes a plurality of protrusions 19A. However, the invention need not be limited to such a configuration. For example, the inner-toothed gear 19, or an engaging part may be formed of rubber or sponge to which the protrusions of the planetary gear 17 engage, or the toothed part 19 may include a single protrusion 19A.

Further, according to the exemplary embodiment, the load generating part includes the first stopper 25B and the first contact part 25A, which contact each other. However, the invention need not be limited to such a configuration. For example, the load may be generated by restricting rotation of another gear which rotates in association with the first output gear 21 or the second output gear 23.

The movement mechanism 9 and the sheet feed mechanism 60 need not be limited to those employed in the exemplary embodiment, and any other suitable mechanism may be employed.

Further, according to the exemplary embodiment, the planetary gear 17 is supported by the arm 17A. However, the invention need not be limited to such a configuration. For example, the planetary gear 17 may be slidably inserted in an arc-shaped groove which extends along an orbital path Lo.

According to the exemplary embodiment, the driving source 31 is forwardly/reversely rotated to forwardly/reversely rotate the sun gear 15. However, the invention need not be limited to such a configuration. For example, a transmission path of the driving force from the driving source 31 to the sun gear 15 may be switched with use of a solenoid or the like so that the sun gear 15 can be forwardly/reversely rotated with keeping the rotation direction of the driving source 31 in one direction.

According to the exemplary embodiment, the direction of the rotation axes of the sun gear 15, the planetary gear 17, the first output gear 21 and the second gear 23 are perpendicular to the sheet placement surface 3A. However, the invention need not be limited to such a configuration. For example, one or more of the rotation axes may be arranged to parallel to the sheet placement surface 3A.

According to the exemplary embodiment, the inner-toothed gear 19 is movable in a direction of the orbital motion of the planetary gear 17. However, the invention need not be limited to such a configuration. For example, the inner-toothed gear 19 may be movable in a radial direction of the sun gear 15, or the inner-toothed gear 19 may be configured to be unmovable.

According to the exemplary embodiment, the first output gear 21 is arranged at a position opposite to the second output gear 23 with the sun gear 15 located therebetween. However, the invention need not be limited to such a configuration.

Further, according to the exemplary embodiment, a CIS (contact image sensor) is employed as the imaging unit 7. However, the invention need not be limited to such a configuration, and a CCD (charge coupled device) may be used as the imaging unit 7.

According to the exemplary embodiment, the third gear 43, the second gear 42 and the first gear 41 are bevel gears. However, the invention need not be limited to such a configuration. For example, the third gear 43 and the second gear 42 may be a worm and a worm wheel, respectively.

According to the exemplary embodiment, the rotation direction of the driving force output by the driving force transmission mechanism 13 is changed twice. However, the invention need not be limited to such a configuration, and the rotation direction may be changed more than twice.

Further, according to the exemplary embodiment, the second gear 42 is a gear including integrally formed first bevel part 42A and the second bevel part 42B. However, the invention need not be limited to such a configuration.

According to the exemplary embodiment, the joint part 45 is configured to be a universal joint. However, the invention need not be limited to such a configuration. For example, the joint part 45 may be omitted. Alternatively, the joint part may be configured by an elastic member made of rubber tube or the like.

According to the exemplary embodiment, the image forming unit 50 employs an electrophotographic imaging method. However, the invention need not be limited to such a configuration, and the image forming unit 50 may be of an inkjet type.

According to the exemplary embodiment, the invention is applied to the image forming device 100 having the image scanning unit 1 and the image forming unit 50. However, the invention need not be limited to be applied to such a device. For example, the invention could be applied to a single-function image scanning device.

The invention should not be limited to the configuration of the exemplary embodiment. The scope of the invention should be interpreted based on the inventions set forth in the claims.

What is claimed is:

1. An image scanning device having a conveyed sheet scanning function to scan an image on an original sheet which is being fed, comprising:
    a sheet conveying roller configured to rotate and contact the sheet when at least the conveyed sheet scanning function is activated;
    a guide member which defines a sheet feed path to guide the sheet;
    a first gear provided in a transmission path through which a driving force is transmitted to the sheet conveying roller;
    a first supporting shaft extending in a direction parallel with a width direction of the sheet feed path and configured to support the first gear;
    a second gear provided in the transmission path and engaging with the first gear;
    a second supporting shaft extending in a direction perpendicular to the first supporting shaft and configured to support the second gear;
    a holder unit holding the second supporting shaft, the holder unit being arranged at a side of a first end, in the width direction, of the sheet feed path;
    a reinforce member made of metal and extending in a direction parallel with the width direction;
    a first fixing unit configured to fix a first longitudinal end of the reinforce member to the holder unit; and
    a second fixing unit configured to fix a second longitudinal end of the reinforce member to the guide member.

2. The image scanning device according to claim 1, wherein the first gear and the second gear are conical bevel gears.

3. The image scanning device according to claim 1, wherein:
    the second longitudinal end of the reinforce member extends to a position corresponding to a second end, in the width direction, of the sheet feed path; and
    the image scanning device further comprises a third fixing unit provided between the first fixing unit and the second fixing unit, the third fixing unit fixing the reinforce member to one of the holder unit and the guide member.

4. The image scanning device according to claim 3, wherein:
    the one of the holder unit and the guide member is provided with a first bearing which holds the first supporting shaft; and
    the third fixing unit is provided at a position corresponding to the first bearing.

5. The image scanning device according to claim 4, wherein:
    the first supporting shaft extends from a position corresponding to the first end, in the width direction, of the sheet feed path to the second end, in the width direction, of the sheet feed path;
    the first bearing is provided at a position corresponding to the first end, in the width direction, of the sheet feed path;
    a second bearing which supports the first supporting shaft is provided at a position corresponding to the second end, in the width direction, of the sheet feed path; and
    the second fixing unit is arranged at a position corresponding to the second end, in the width direction, of the sheet feed path.

6. The image scanning device according to claim 5, further comprising:
    a pinch roller configured to urge the sheet being fed toward the sheet conveying roller;
    an elastic member configured to generate a pressing force which presses the pinch roller toward the sheet conveying roller; and
    a load receiving part formed on the reinforce member and configured to receive a reactive force which is generated on the elastic member due to generation of the pressing force.

7. The image scanning device according to claim 6, wherein a recessed part is formed on the reinforce member at a position corresponding to the pinch roller, the recessed part is recessed in a direction away from the pinch roller.

8. The image scanning device according to claim 1, wherein a cross section of the reinforce member taken along a plane perpendicular to a longitudinal direction of the reinforce member is substantially an L-shaped cross section.

9. The image scanning device according to claim 1, wherein the holder unit and the guide member are made of resin.

10. The image scanning device according to claim 1, wherein:
   the holder unit and the guide member are separate members; and
   one of the guide member and the holder unit is provided with a recessed portion in which a protrusion provided to the other of the guide member and the holder unit is to be fitted.

11. The image scanning device according to claim 1, wherein one of the first fixing unit and the second fixing unit is a screw type fixing unit, while the other of the first fixing unit and the second fixing unit is an insertion type using an inserting part and a hole that receives the inserting part.

12. The image scanning device according to claim 1,
   wherein the image scanning device further has a placed sheet scanning function in which the sheet placed on a sheet placement surface of a platen unit is scanned in addition to the conveyed sheet scanning function,
   wherein the image scanning device further comprises a sheet cover which is displaceable between a covering position at which the cover covers the platen unit and an open position at which the cover is spaced from the platen unit, and
   wherein the sheet conveying roller, the guide member, the first gear, the second gear, the first supporting shaft, the second supporting shaft, the holder unit, the reinforce member, the first fixing unit and the second fixing unit are provided to the cover.

13. The image scanning device according to claim 12, wherein a driving source generating the driving force is provided on the platen unit.

14. The image scanning device according to claim 1, wherein the first gear, the first supporting shaft and the sheet conveying roller are integrally formed and rotate at the same time.

15. The image scanning device according to claim 1, wherein the first longitudinal end of the reinforce member extends to a position corresponding to the second supporting shaft of the holder unit.

* * * * *